US006256082B1

(12) United States Patent
Suzuki et al.

(10) Patent No.: US 6,256,082 B1
(45) Date of Patent: *Jul. 3, 2001

(54) LIQUID CRYSTAL DISPLAY WITH A LIQUID CRYSTAL ORIENTATION CONTROLLING ELECTRODE AND PROCESSES FOR MANUFACTURING AND DRIVING THEREOF

(75) Inventors: Masayoshi Suzuki; Hideya Murai; Toshiya Ishii; Yoshihiko Hirai; Kazumi Kobayashi; Hiroaki Matsuyama; Daisuke Inoue, all of Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/166,166

(22) Filed: Oct. 5, 1998

(30) Foreign Application Priority Data

| Oct. 6, 1997 | (JP) | 9-272871 |
| Apr. 15, 1998 | (JP) | 10-104562 |
| Apr. 16, 1998 | (JP) | 10-106396 |

(51) Int. Cl.$^7$ .................. G02F 1/1343; G02F 1/1337; G02F 1/1335
(52) U.S. Cl. .................. 349/144; 349/128; 349/117
(58) Field of Search .................. 349/128, 144, 349/178, 117

(56) References Cited

U.S. PATENT DOCUMENTS

| 5,608,556 | * | 3/1997 | Koma | 349/143 |
| 5,658,492 | * | 8/1997 | Murashiro et al. | 252/299.61 |
| 5,666,179 | * | 9/1997 | Koma | 349/143 |
| 5,736,067 | * | 4/1998 | Kawata et al. | 349/117 |
| 5,781,262 | * | 7/1998 | Suzuki et al. | 349/128 |

FOREIGN PATENT DOCUMENTS

| 60-256121 | | 12/1985 | (JP) . |
| 4-261522 | * | 9/1992 | (JP) . |
| 6-43461 | * | 2/1994 | (JP) . |
| 7-49509 | * | 2/1995 | (JP) . |
| 7-84254 | * | 3/1995 | (JP) . |
| 7-199190 | | 8/1995 | (JP) . |
| 7-230097 | | 8/1995 | (JP) . |
| 9-105041 | * | 4/1997 | (JP) . |
| 9-120059 | * | 5/1997 | (JP) . |
| 9-152583 | | 6/1997 | (JP) . |

* cited by examiner

*Primary Examiner*—William L. Sikes
*Assistant Examiner*—Tarifur R. Chowdhury
(74) *Attorney, Agent, or Firm*—Sughrue, Mion, Zinn, Macpeak & Seas, PLLC

(57) ABSTRACT

This invention provide a liquid crystal display comprising a liquid crystal layer between two substrates each of which has an electrode, wherein the liquid crystal layer concomitantly has at least two micro-regions, and the electrode on one of the substrates has an opening, in the region of which there is provided a second electrode for controlling the initial orientation of the liquid crystal. The liquid crystal display has improved properties such as high contrast, quick response and excellent properties for an angle of visibility and can be manufactured without troublesome steps such as a photoresist step.

16 Claims, 13 Drawing Sheets

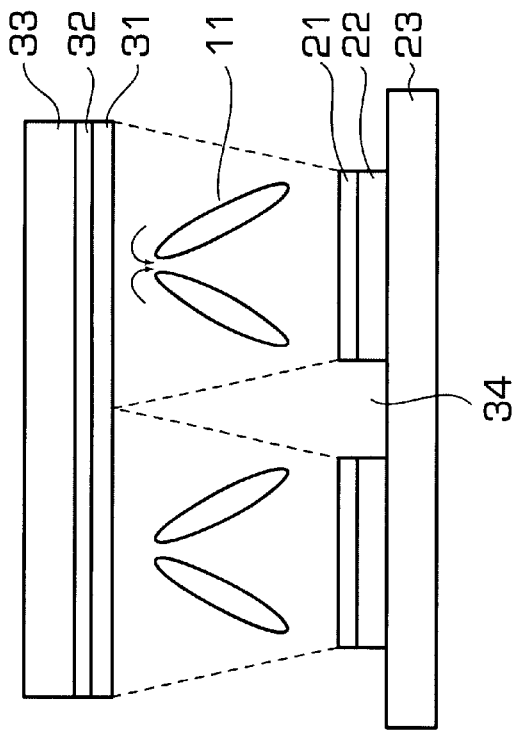
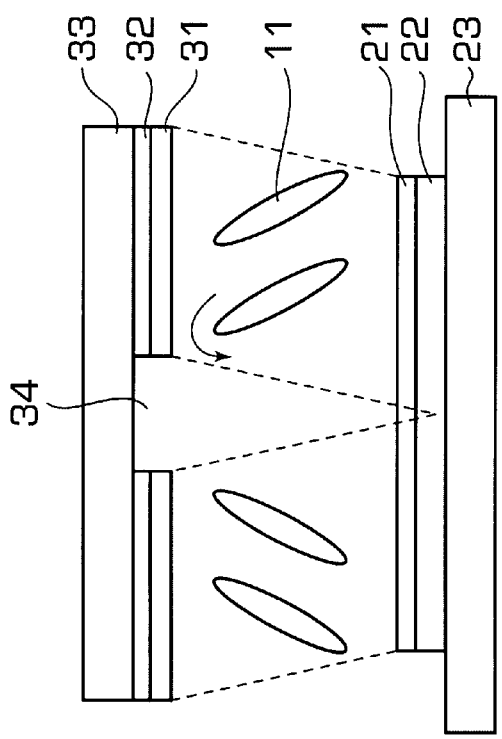

LIQUID CRYSTAL DISPLAY WITH A LIQUID CRYSTAL ORIENTATION CONTROLLING ELECTRODE AND PROCESSES FOR MANUFACTURING AND DRIVING THEREOF

BACKGROUND OF THE INVENTION

1. Field of the Invention

This invention relates to a liquid crystal display and processes for manufacturing and driving thereof. In particular, it relates to a liquid crystal display which can be readily manufactured, has excellent properties for an angle of visibility and can give a quick response, as well as processes for manufacturing and driving thereof.

2. Description of the Related Art

In a twisted nematic (hereinafter referred to as "TN") type of liquid crystal display which has been widely used, its display status is gradually changed from "white" where a voltage is not applied and thus liquid crystal molecules are parallel to the surface of a substrate, to "black" by varying an applied voltage to change the direction of the director of the liquid crystal molecules in the direction depending on the electric field.

The TN type of liquid crystal display, however, has a narrow angle of visibility due to the unique behavior of the liquid crystal molecules by applying a voltage; it is particularly marked in the rising-up direction of the liquid crystal molecules in half tone display.

The TN type of liquid crystal display does not respond sufficiently quick to be suitable for displaying animation.

JP-A 4-261522 and JP-A 6-43461 have suggested techniques for improving properties for an angle of visibility of a liquid crystal display. In the techniques, a homeotropically-oriented liquid crystal cell is prepared. It is placed between two polarizing plates located in a manner that their polarization axes are perpendicular to each other. As shown in FIG. 7, using a common electrode 32 having an opening 34, a nonuniform field is generated to divide each pixel into at least two liquid crystal domains for improving the properties for an angle of visibility. JP-A 4-261522 has disclosed a process for achieving a high contrast by controlling a direction of an orientation of liquid crystal molecules when a voltage is applied. As described in JP-A 6-43461, properties for an angle of visibility in the "black" status, may be, if necessary, improved by using an optical compensator. Furthermore, JP-A 6-43461 has disclosed that each pixel may be divided into at least two domains by a nonuniform field in a TN-oriented cell as well as a homeotropically-oriented liquid crystal cell for improving their properties for an angle of visibility.

These techniques, however, require "fine processing steps such as a photoresist step for the common electrode 32" which is not necessary for manufacturing a usual TN type of liquid crystal display and advanced superposition of the upper and the lower substrates 23, 33. The problem is particularly marked for an active matrix type of liquid crystal display employing switching elements such as TFT. Specifically, in a usual active matrix type of liquid crystal display, active elements such as thin-film diodes are fabricated on one transparent substrate. Fine processing steps such as a photoresist step are, therefore, required only on one substrate, while the other substrate on the side of the electrode usually called as "a common electrode" does not require fine processing and has only an electrode on its overall surface. On the other hand, the display of the above-mentioned prior art requires fine processing steps such as a photoresist step for "a common electrode" which does not need to be finely processed, leading to increase of the number of steps and necessity for advanced superposing the upper and the lower substrates 23, 33.

In addition, as shown in FIG. 7, the display of the prior art described above has a disadvantage that since it does not have an electrode in the region of the opening 34, the region may not be provided with a sufficient field for liquid crystal molecules to adequately respond to a voltage applied to the electrode 32. Furthermore, the display of the prior art has a disadvantage that it does not give a quick response.

JP-A 9-105041 has disclosed another technique for improving properties for angle of visibility, in which in one substrate liquid crystal molecules are oriented substantially vertical to the substrate surface, while in the other substrate the molecules are oriented substantially parallel to the substrate surface; and each pixel is divided into a plurality of regions different in a rising (lying for a vertical orientation part) direction of liquid crystal molecules to compensate the properties for angle of visibility in these regions each other and thus to enlarge the angle of visibility.

The technique disclosed in JP-A 9-105041 requires additional complicated processes such as a photoresist process for dividing each pixel into a plurality of regions and a polarized radiation process via a mask. FIG. 9 shows an example in which a pixel is divided into two regions. To make the orientation directions of the liquid crystals different by 180° each other in rubbing, there must be added a series of processes, i.e., rubbing the surface of the substrate in one direction 41 while covering a half of the pixel region with, e.g., a resist mask, removing the resist mask, and then rubbing the substrate in the opposite direction while covering the remaining exposed half of the pixel region with a resist mask. When employing polarized radiation, there must be added a series of processes, i.e., radiating polarized light on a half of the pixel from an oblique direction using a similar mask and then radiating polarized light on the remaining unexposed half from an oblique direction different from the first direction by 180°.

In addition, JP-A 7-84254 and JP-A 7-49509 have disclosed techniques for improving properties of angle of visibility and a response speed of a liquid crystal display. In these techniques, a bend-oriented liquid crystal cell is prepared, which is then placed between two polarizing plates whose polarization axes are perpendicular to each other. Thus, such a display utilizes the action that the orientations near upper and lower substrates compensate their birefringence each other, to improve its properties for angle of visibility, as shown in FIG. 10. This approach has an advantage of quick response. As described in JP-A 7-84254, the display employs an optical compensator if necessary, to improve properties for angle of visibility in black. Furthermore, JP-A 9-120059 has disclosed a technique that after voltage application, prepolymer is polymerized with UV radiation to stabilize bend orientation, for preventing the bend orientation from being converted into spray orientation.

The display utilizing bend orientation exhibits quicker response and is improved in properties for angle of visibility, compared with a conventional TN-oriented display. It, however, has regions in which gradation inversion occurs, resulting in inadequate properties for angle of visibility.

An approach that a pixel is divided by providing an opening in the electrode on one substrate (JP-A 4-2615522 and JP-A 6-43461) cannot be applied to bend orientation in which the tilt directions of both upper and lower substrates should be controlled.

SUMMARY OF THE INVENTION

An objective of this invention is to solve the problems in the prior art, i.e., to provide a liquid crystal display which exhibits high contrast and quick response and has excellent properties for an angle visibility.

Another objective of this invention is to provide a process for readily manufacturing the above liquid crystal display without increase of troublesome processes such as a photoresist step.

A further objective of this invention is to provide a driving process by which the liquid crystal display can fully exhibit its good features such as high contrast, quick response and excellent properties for an angle of visibility.

This invention provides a liquid crystal display comprising a liquid crystal layer between two substrates each of which has an electrode, wherein the liquid crystal layer concomitantly has at least two micro-regions, and the electrode on one or both of the substrates have an opening, in the region of which there is provided a second electrode for controlling the initial orientation of the liquid crystal.

This invention also provides a liquid crystal display comprising a liquid crystal layer between two substrates each of which has an electrode, wherein the liquid crystal layer concomitantly has at least two micro-regions, and one or both of the substrates have the electrode on which there is provided a second electrode insulated from the said electrode for controlling the initial orientation of the liquid crystal.

This invention further provides a process for manufacturing a liquid crystal display comprising a liquid crystal layer between two substrates each of which has an electrode, wherein the liquid crystal layer concomitantly has at least two micro-regions, and the electrode on one or both of the substrates have an opening, in the region of which there is provided a second electrode for controlling the initial orientation of the liquid crystal, comprising the steps of injecting liquid crystal into an empty panel which has two substrates each of which has an electrode, and in which the electrode on one or both of the substrates have an opening where there is provided second electrode for controlling the initial orientation of the liquid crystal; and applying, between the second electrode and a counter electrode thereto, a voltage equal to or higher than that applied between the electrode having the opening and a counter electrode thereto to control the initial orientation of the liquid crystal.

This invention further provides a process for manufacturing a liquid crystal display comprising a liquid crystal layer between two substrates each of which has an electrode, wherein the liquid crystal layer concomitantly has at least two micro-regions, and one or both of the substrates have the electrode on which there is provided a second electrode insulated from the said electrode for controlling the initial orientation of the liquid crystal, comprising the steps of injecting liquid crystal into an empty panel which has two substrates each of which has an electrode, and in which one or both of the substrates have the electrode on which there is provided second electrode insulated from the said electrode for controlling the initial orientation of the liquid crystal; and applying, between the second electrode and a counter electrode thereto, a voltage equal to or higher than that applied between the electrode having the second electrode and a counter electrode thereto to control the initial orientation of the liquid crystal.

This invention further provides a process for driving a liquid crystal display comprising a liquid crystal layer between two substrates each of which has an electrode, wherein the liquid crystal layer concomitantly has at least two micro-regions, and the electrode on one or both of the substrates have an opening, in the region of which there is provided a second electrode for controlling the initial orientation of the liquid crystal, comprising the step of applying, between the second electrode and a counter electrode thereto, a voltage equal to or higher than that applied between the electrode having the opening and a counter electrode thereto.

This invention further provides a process for driving a liquid crystal display comprising a liquid crystal layer between two substrates each of which has an electrode, wherein the liquid crystal layer concomitantly has at least two micro-regions, and one or both of the substrates have the electrode on which there is provided a second electrode insulated from the said electrode for controlling the initial orientation of the liquid crystal, comprising the step of applying, between the second electrode and a counter electrode thereto, a voltage equal to or higher than that applied between the electrode having the second electrode and a counter electrode thereto.

In the above liquid crystal display of this invention, the liquid crystal layer can be divided into at least two micro-regions by applying a voltage between the second electrode and the counter electrode thereto to control the initial orientation of the liquid crystal. Thus, a display with high contrast, quick response and excellent properties for an angle of visibility such as a wide angle of visibility can be provided without increase of troublesome manufacturing steps such as a photoresist step.

The description, "in the region of the opening" herein means that the opening and the second electrode almost overlap in a front view of the liquid crystal display; it does not necessarily mean that the second electrode is at the same position as the opening in a section view. In other words, the opening and the second electrode may be in "the same layer" as shown in FIG. 3 as well as in "different layers" via an insulating film as shown in FIG. 1. Herein, the description, "the opening and the second electrode is in the same layer" means that there is provided the second electrode 25 electrically insulated from a pixel electrode 22, in the opening 24 formed in the pixel electrode 22, for example, as shown in FIG. 3. The description, "the initial orientation of the liquid crystal" means the orientation of the liquid crystal at the beginning of driving in its broad sense, and may also mean the initial orientation during manufacturing the panel.

According to the invention, there can be provided a liquid crystal display with high contrast, quick response and excellent properties for an angle of visibility. Such a liquid crystal display may be used to display an excellent image. The liquid crystal display can be readily manufactured at a reduced cost, without increase of troublesome steps such as a photoresist step.

BRIEF DESCRIPTION OF THE DRAWINGS

FIGS. 8(a–b) show a cross section of a liquid crystal display of the prior art.

DETAILED DESCRIPTION OF THE PREFERRED EMBODIMENTS

Figure 1:
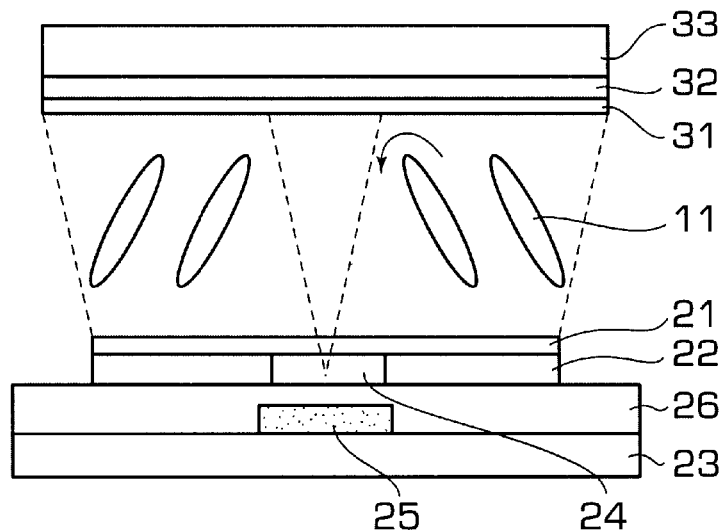
FIG. 1 shows a cross section of a liquid crystal display according to this invention.

In the liquid crystal display of this invention, the liquid crystal layer can be selected from those consisting of liquid crystal with a negative dielectric anisotropy, those whose orientation is perpendicular to one substrate plane around it while parallel to the other substrate plane around it, and those whose liquid crystal is subject to bent deformation from one to the other substrates.

For these liquid crystal layer, it is preferable that at least two micro-regions in the liquid crystal layer have different tilt directions of liquid crystal molecules with each other.

The liquid crystal display of this invention preferably has at least one optical compensator between a polarizing plate and a liquid crystal cell for further improving properties for an angle of visibility. It is preferable that the optical compensator is optically negative in the light of compensating retardation change in an oblique direction. Such a compensator may be a sheet of film prepared by biaxial stretching. A similar effect may be achieved by using a substantially optically-negative uniaxial compensator prepared by at least two sheets of uniaxially-stretched films.

When the liquid crystal layer has a bent deformation from one to the other substrates, it is preferable that the optical compensator is optically negative and uniaxial, and is positioned in a manner that the direction of its optical axis is the same as that of the normal line of the substrate. When the liquid crystal is initially in bend orientation in principle, positioning the uniaxial compensator which is optically negative in a manner that the direction of its optical axis is the same as that of the normal line of the substrate, can delete retardation from an oblique direction. Thus, owing to its symmetry, one uniaxial compensator which is optically negative can perform adequate compensation even when a pixel is divided into a plurality of regions.

Furthermore, a film with a positive optical anisotropy can be applied to the liquid crystal display of this invention. When the liquid crystal is initially in vertical or bend orientation in principle, owing to device characteristics, deviation to some direction, if any, can be further compensated. For example, by compensating, when necessary, the optical anisotropy of the liquid crystal layer in an in-plane direction using a film with a positive optical anisotropy, whitening in an oblique direction during displaying black can be effectively controlled.

In the manufacturing process of this invention, it is preferred to apply a voltage between the second electrode and the counter electrode while applying a pressure on the substrate. There are no restrictions for pressure application as long as on the liquid crystal layer there can be generated a stress sufficient to achieve adequate dividing. The stress may be generated on the liquid crystal layer by mechanical vibration. Thus, movement of liquid crystal molecules is accelerated, more liquid crystal molecules move in the direction depending on the electric field, and then a boundary region moves in the direction depending on the electric field. Consequently, an excellent liquid crystal display can be provided, in which each pixel is divided at an entirely desired position.

Herein, it may be adequate to apply a pressure on the substrate, sufficient to move the boundary region of the liquid crystal. Such a pressure may be applied with a large pressure device or it may be a low pressure applied by an object with, e.g., a shape of nib. The pressure may be applied continuously, intermittently or periodically.

A variety of mechanical vibrations may be employed as long as they can generate a stress on the liquid crystal layer, by which the micro-regions may be moved; e.g., vibrations based on a mechanical structure using, for example cams, and sound wave such as ultrasonic and infrasonic waves. Above all, vibration by ultrasonic wave is desirable, whose frequency and intensity may be selected as appropriate.

In the manufacturing process of this invention, the initial orientation of the liquid crystal is controlled by applying a given voltage to a control electrode (the second electrode). The initial orientation of the liquid crystal may be controlled only by applying a voltage to the control electrode at room temperature, or preferably by making the liquid crystal layer isotropic by heating the liquid crystal filled in a vacant panel and then allowing it to be cooled from a temperature equal to or higher than the isotropic phase-liquid crystal phase transition point of the liquid crystal to a temperature lower than the transition point, while applying a voltage on the control electrode. Alternatively, it may be preferable that a voltage is applied to the control electrode to control the initial orientation of the liquid crystal and then a small amount of polymerizable monomer or oligomer blended in the liquid crystal is polymerized. Furthermore, the above temperature control and polymerization may be combined. By these procedures, a desired liquid crystal orientation may be ensured. Furthermore, it can solve the problem that the orientation is converted into spray orientation as in a conventional bent orientation cell.

When controlling the initial orientation by applying a voltage to the control electrode at room temperature while polymerization is conducted without controlling temperature, it is preferable that polymerization is conducted after application of the voltage, but the polymerization reaction may be conducted prior to application of the voltage. When temperature control and polymerization are combined, the reaction of monomer or oligomer may be conducted before or during heating the liquid crystal layer to make it isotropic or after cooling it. It is preferable that after filling a vacant panel with liquid crystal containing monomers or oligomers, the monomers or oligomers are polymerized in the liquid crystal while applying voltage between the second electrode and its counter electrode. Alternatively, after filling a vacant panel with liquid crystal containing monomers or oligomers, the liquid crystal is made isotropic by heating and then allowing it to be cooled from a temperature equal to or higher than the isotropic phase-liquid crystal phase transition point of the liquid crystal to a temperature lower than the transition point, while applying a voltage on the control electrode, and then polymerizing the monomers or oligomers in the liquid crystal.

In the manufacturing process of the liquid crystal display of this invention, the initial orientation can be very reliably controlled by the control electrode, by means of treating the substrate in advance by, e.g., rubbing or photo-orientation to control a pre-tilt angle according to a divided configuration (treatment for dividing the orientation direction of the liquid crystal). Furthermore, it may be highly effective that a small amount of polymerizable monomer or oligomer in the liquid crystal is polymerized to prevent the orientation from being disturbed due to a drive voltage.

For treating by rubbing, divided orientation may be conducted with photoresist. For treating by photo-orientation, the oriented film may comprise some compound having a functional group which can control the orientation of the liquid crystal by radiating polarized light, such as cinnamic acid group, and polarized light is radiated on each region from an oblique direction via a mask. Polarized light may be radiated from an oblique direction via a mask in a manner that a pre-tilt angle is provided along with a divided shape, using a polymer as an oriented film whose light-sensitive groups can be polymerized by polarized radiation, as described in AM-LCD '96/IDW '96 Digest of Technical Papers, p.337.

Such a divided orientation method is well-known in the art, but stability of division may be remarkably improved by using a control electrode as in the process of this invention. In addition, polymerization of a small amount of polymerizable monomer or oligomer in the liquid crystal can make it more reliable to maintain division during driving. Furthermore, polymerization for memorizing the liquid crystal orientation as described above can make its response quicker.

The liquid crystal layer of the liquid crystal display of this invention may contain a polymer compound. The polymer may have a similar structure to that of the liquid crystal molecule comprising a liquid-crystalline monomer or oligomer unit. However, since it is not necessarily used for orienting the liquid crystal, the structure may more flexibly have, for example, alkylene chains and/or monofunctional, bifunctional or polyfunctional, i.e., tri- or higher-functional monomer or oligomer units, such as dicyclopentenylacrylate and polybutadiene.

The polymer is added or formed mainly for stabilizing divided-orientation state. When the orientation direction of the liquid crystal by the control electric field and a pixel is divided into a plurality of regions whose orientation direction of the liquid crystal are different from each other, the divided state may disappear after the control electric field is removed. For preventing it to achieve reliable division, the polymer is added or formed. It may contribute to the orientation of the liquid crystal, but the main contributor to the orientation is an oriented film.

Monomers and oligomers which can be used in this invention include photocurable or thermosetting monomers or oligomers. A polymerizable material can contain other ingredients in addition to these monomers and/or oligomers. Monomers and oligomers which can be used in this invention include not only those reactive to visible light but also ultraviolet curable monomers whose reaction may be initiated by UV. In the light of operability, the latter is particularly preferable.

Photo- or ultraviolet-curable monomers which can be used in this invention include monofunctional acrylates such as 2-ethylhexyl acrylate, butylethyl acrylate, butoxyethyl acrylate, 2-cyanoethyl acrylate, benzyl acrylate, cyclohexyl acrylate, 2-hydroxypropyl acrylate, 2-ethoxyethyl acrylate, N,N-ethylaminoethyl acrylate, N,N-dimethylaminoethyl acrylate, dicyclopentanyl acrylate, dicycloepentenyl acrylate, glycidyl acrylate, tetrahydrofurfuryl acrylate, isobornyl acrylate, isodecyl acrylate, lauryl acrylate, morpholine acrylate, phenoxyethyl acrylate, phenoxydiethyleneglycol acrylate, 2,2,2-trifluoroethyl acrylate, 2,2,3,3,3-pentafluoropropyl acrylate, 2,2,3,3-tetrafluoropropyl acrylate and 2,2,3,4,4,4-hexafluorobutyl acrylate.

The compounds may be selected from monofunctional methacrylate compounds such as 2-ethylhexyl methacrylate, butylethyl methacrylate, butoxyethyl methacrylate, 2-cyanoethyl methacrylate, benzyl methacrylate, cyclohexyl methacrylate, 2-hydroxypropyl methacrylate, 2-ethoxyethyl methacrylate, N,N-diethylaminoethyl methacrylate, N,N-dimethylaminoethyl methacrylate, dicyclopentanyl methacrylate, dicycloepentenyl methacrylate, glycidyl methacrylate, tetrahydrofurfuryl methacrylate, isobornyl methacrylate, isodecyl methacrylate, lauryl methacrylate, morpholine methacrylate, phenoxyethyl methacrylate, phenoxydiethyleneglycol methacrylate, 2,2,2-trifluoroethyl methacrylate, 2,2,3,3-tetrafluoropropyl methacrylate and 2,2,3,4,4,4-hexafluorobutyl methacrylate.

The compounds may be selected from polyfunctional acrylates such as 4,4'-biphenyl diacrylate, diethylstilboestrol diacrylate, 1,4-bisacryloyloxybenzene, 4,4'-bisacryloyloxydiphenyl ether, 4,4'-bisacryloyloxydiphenylmethane, 3,9-bis[1,1-dimethyl-2-acryloyloxyethyl]-2,4,8,10-tetraspiro[5,5]undecane, α,α'-bis[4-acryloyloxyphenyl]-1,4-diisopropylbenzene, 1,4-bisacryloyloxytetrafluorobenzene, 4,4'-bisacryloyloxyoctafluorobiphenyl, diethyleneglycol diacrylate, 1,4-butanediol diacrylate, 1,3-butyleneglycol diacrylate, dicyclopentanyl diacrylate, glycerol diacrylate, 1,6-hexanediol diacrylate, neopentylglycol diacrylate, tetraethyleneglycol diacrylate, trimethylolpropane triacrylate, pentaerythritol tetraacrylate, pentaerythritol triacrylate, di(trimethylol)propane tetraacrylate, di(pentaerythritol) hexaacrylate, di(pentaerythritol)monohydroxy pentaacrylate, 4,4'-diacryloyloxystilbene, 4,4'-diacryloyloxydimethylstilbene, 4,4'-diacryloyloxydiethylstilbene, 4,4'-diacryloyloxydipropylstilbene, 4,4'-diacryloyloxydibutylstilbene, 4,4'-diacryloyloxydipentylstilbene, 4,4'-diacryloyloxydihexylstilbene, 4,4'-diacryloyloxydifluorostilbene, 2,2,3,3,4,4-hexafluoropentanediol-1,5-diacrylate, 1,1,2,2,3,3-hexafluoropropyl-1,3-diacrylate and urethane acrylate oligomers.

The compounds may be selected, but not limited to, from polyfunctional methacrylates such as diethyleneglycol dimethacrylate, 1,4-butanediol dimethacrylate, 1,3-butyleneglycol dimethacrylate, dicyclopentanyl dimethacrylate, glycerol dimethacrylate, 1,6-hexanediol dimethacrylate, neopentylglycol dimethacrylate, tetraethyleneglycol dimethacrylate, trimethylolpropane trimethacrylate, pentaerythritol tetramethacrylate, pentaerythritol trimethacrylate, di(trimethylol)propane tetramethacrylate, di(pentaerythritol) hexamethacrylate, di(pentaerythritol)monohydroxy pentamethacrylate, 2,2,3,3,4,4-hexafluoropentanediol-1,5-dimethacrylate, and urethane methacrylate oligomers; styrene; aminostyrene; and vinyl acetate.

Since a driving voltage in this invention may be affected by interface interaction between polymer and liquid crystal materials, the above compounds may contain fluorine atoms. Such compounds include, but not limited to, polymers prepared from mixtures containing 2,2,3,3,4,4-hexafluoropentanediol-1,5-diacrylate, 1,1,2,2,3,3-hexafluoropropyl-1,3-diacrylate, 2,2,2-trifluoroethyl acrylate, 2,2,3,3,3-pentafluoropropyl acrylate, 2,2,3,3-tetrafluoropropyl acrylate, 2,2,3,4,4,4-hexafluorobutyl acrylate, 2,2,2-trifluoroethyl methacrylate, 2,2,3,3-tetrafluoropropyl methacrylate, 2,2,3,4,4,4-hexafluorobutyl methacrylate or urethane acrylate oligomers.

When photo- or ultraviolet-curable monomers are used in polymerization reaction in this invention, initiators for light or UV may be used. These may be selected from a variety of initiators such as acetophenones such as 2,2-diethoxyacetophenone, 2-hydroxy-2-methyl-1-phenyl-1-one, 1-(4-isopropylphenyl)-2-hydroxy-2-methylpropan-1-one and 1-(4-dodecylphenyl)-2-hydroxy-2-methylpropan-1-one; benzoins such as benzoin methyl ether, benzoin ethyl ether and benzyl dimethyl ketal; benzophenones such as benzophenone, benzoylbenzoic acid, 4-phenylbenzophenone and 3,3-dimethyl-4-methoxybenzophenone; thioxanthones such as thioxanthone, 2-chlorothioxanthone and 2-methylthioxanthone; diazonium salts; sulfonium salts; iodonium salts; and selenium salts.

Some embodiments of this invention will be described with reference to the drawings.

First Embodiment

In the liquid crystal display of this invention, a layer comprising liquid crystal molecules 11 with a negative dielectric anisotropy is placed between two substrates 23, 33 which have an electrode 22 or 32, respectively. On each electrode is formed a vertical oriented film 21 or 31, which may be, if necessary, rubbed. An opening 24 is formed in the electrode 22 on one substrate 23, and at the same position, second electrode 25 is formed for controlling the initial orientation of the liquid crystal. Different voltages may be applied to the electrode 22 and the second electrode 25.

In a conventional liquid crystal display which does not have the opening 24 or the second electrode 25, when a voltage is applied, liquid crystal molecules are tilted in a random direction, without rubbing treatment, while in the rubbing direction if it has been rubbed. On the other hand, the liquid crystal display of this invention has the electrode 22 and also the second electrode 25 for controlling the initial orientation of the liquid crystal. An oblique field may be, therefore, generated in the liquid crystal layer by, for example, applying a voltage between the second electrode 25 and the electrode 32, which is higher than that applied to the electrodes 22 or 32. Thus, the liquid crystal molecules 11 are tilted along the oblique field as shown in FIG. 1.

Figure 7A:
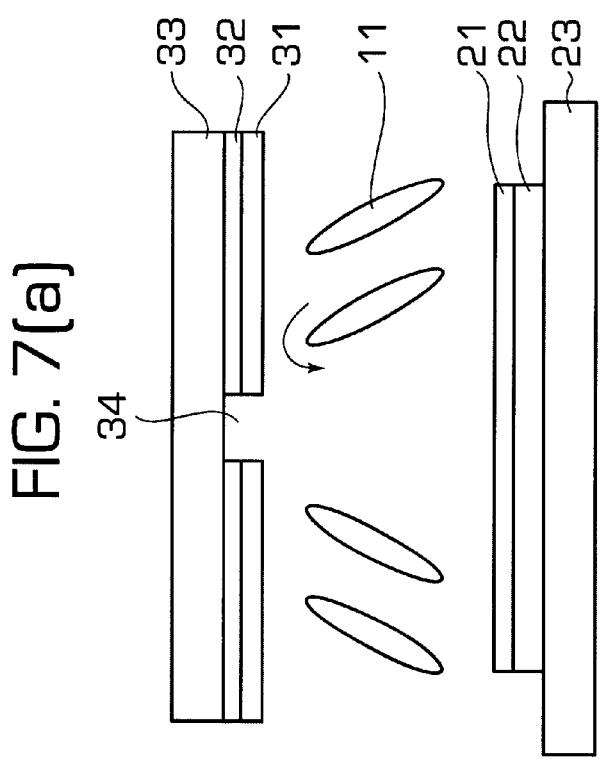
FIGS. 7(a–c) are an explanatory drawing of a liquid crystal display of the prior art.
Figure 7B:
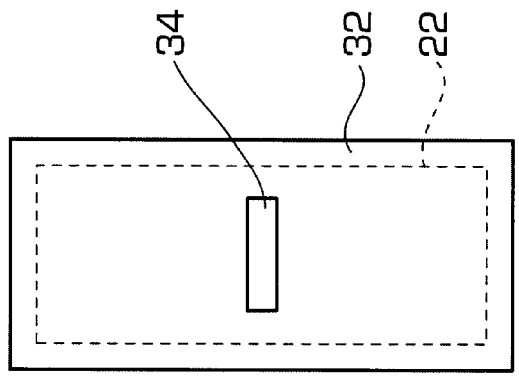
Figure 7C:
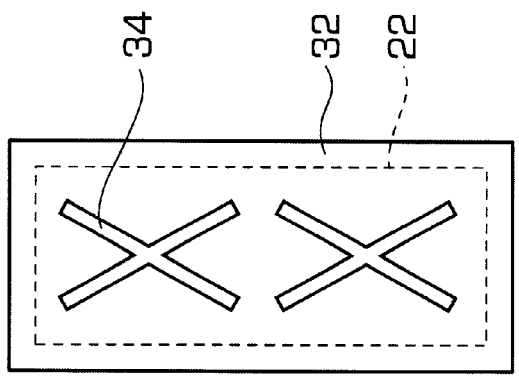
Figure 9:
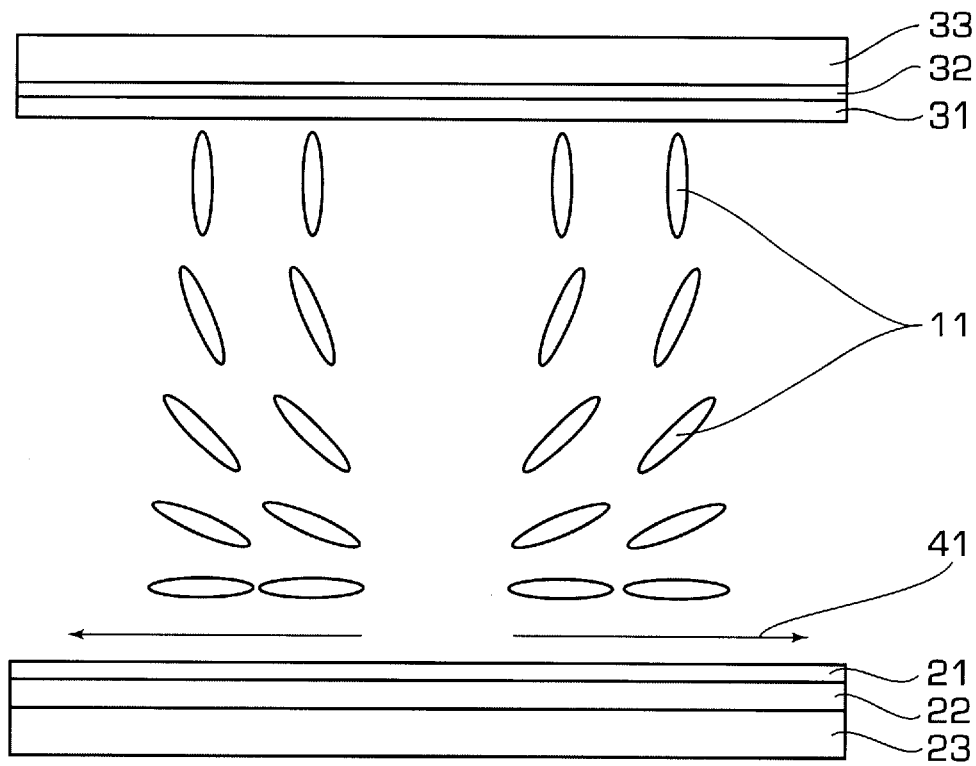
FIG. 9 shows a cross section of a liquid crystal display of the prior art.
Figure 10:
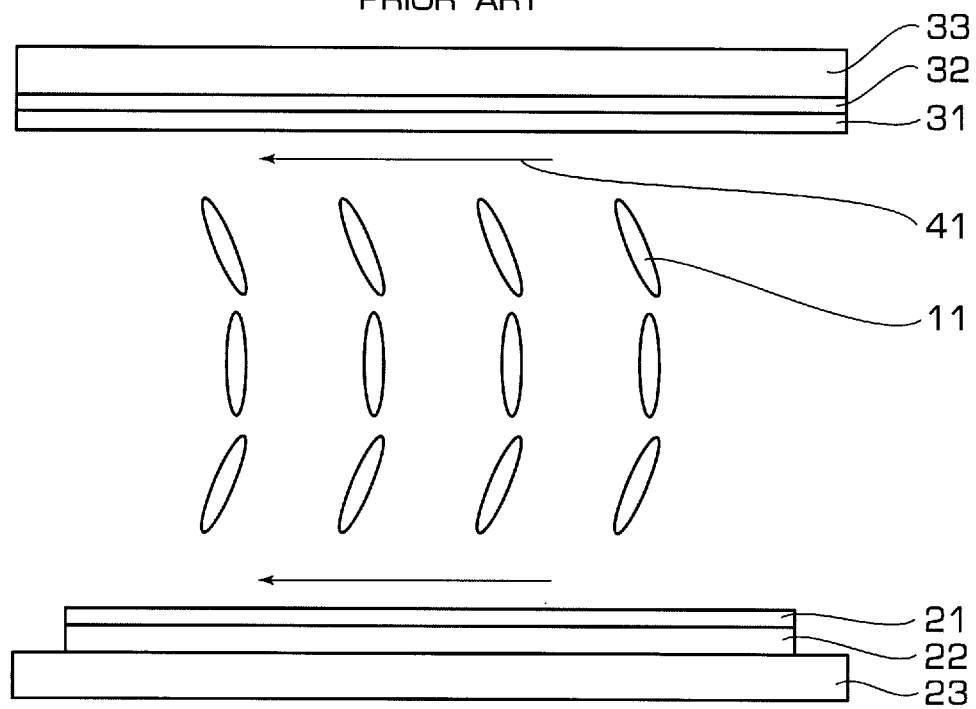
FIG. 10 shows a cross section of a liquid crystal display of the prior art.

Similar behavior of liquid crystal may be achieved by using an electrode provided with an opening as in a conventional display shown in FIG. 7. However, since an electrode is not formed in the region of the opening 34 as shown in FIG. 7 in the prior art, an adequate electric field is not applied in the region even when a voltage is applied to the electrode 32, and thus the liquid crystal may not adequately respond to the applied voltage.

We have found that a desired effect cannot be obtained only by forming an opening, particularly when driving with active devices. Specifically, in a common active device, an electrode on the side of the color filter (generally called as a "common electrode") may be formed over all the substrate surface without requiring a photoresist step. On the substrate on the side of active devices, a switching device is formed for each pixel and pixel electrodes are separated each other. In such a form of device, it is essential to form an opening in the common electrode for generating an oblique field based on difference in size between the upper and the lower electrodes, by which liquid crystal molecules are tilted in a divided manner. FIGS. 8(a) and 8(b) show cross sections of liquid crystal displays in which an opening is formed in a common electrode and an electrode on the side of the active device, respectively. As seen in FIG. 8(b), when the electrode 22 on the side of the active device is small, there may be generated regions with an opposite direction of tilt and not providing an oblique field between the electrodes. The regions may cause disclination and make a tilt direction of the liquid crystal uncontrollable. Thus, the display may fail to provide desired orientation for uniform display. It is, however, necessary to perform a photoresist step on the side of the common electrode for forming an opening in the common electrode. Such a manufacturing process requires a photoresist step which is not necessary for a conventional liquid crystal display, resulting in reduction of an yield and price-up.

Forming an opening in a pixel electrode on the side of the active device as in this invention requires changing a mask, but not an additional photoresist step. Since the procedure alone has a defect that there may be generated areas without an oblique electric field, second electrode for controlling the orientation of the liquid crystal is, therefore, formed in the region of the opening and then a voltage is applied to generate an oblique field, which is indicated by broken lines in FIG. 1.

Figure 3:
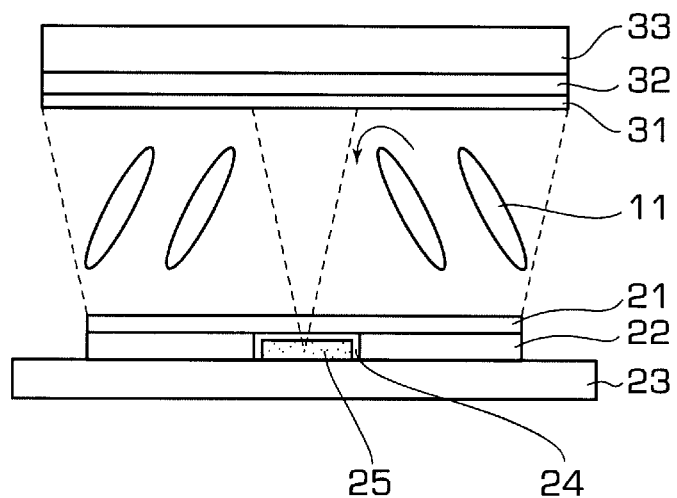
FIG. 3 shows a cross section of another liquid crystal display according to this invention.

The second electrode for controlling the orientation of the liquid crystal can be formed as a different layer from electrode layers such as a signal and a drain wire when the active device is prepared, but it is preferably formed on the same layer as any of the electrode layers. Thus, changing a mask alone may be adequate to generate a desired oblique field without an additional photoresist step. For example, an electrode layer constituting a gate electrode layer may be used as second electrode layer. The second electrode 25 provides a similar effect whether it is formed in the opening 24 while isolated from the electrode 22 (FIG. 3) or at the same position as the opening 24 via an insulating layer 26 (FIG. 1).

The control electrode (second electrode) in this invention basically has a shape of "X" as shown in FIG. 5. In the light of a dividing status, desirable shapes are one consisting of two combined "Y" s having a section parallel to a side of a pixel as shown in FIG. 5(b) and one consisting of two combined "T"s as shown in FIG. 5(c). These shapes may have not only straight sections but also curved sections as FIGS. 5(d) and 5(e). Furthermore, the finer the division is, the more effective the controlling field is, so that a shape comprising a plurality of Xs as shown in FIG. 5(f) or 5(g) is more preferable. An electrode section between Xs may be connected, as a control electrode, with another control electrode or may be floating. In these figures, control electrodes of pixels are drawn as separated from each other, for convenience. Practically, these are, however, connected with each other, by which a voltage can be simultaneously applied from an output terminal of a panel side.

Figure 5D:
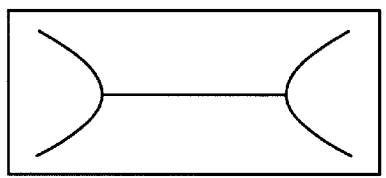
FIGS. 5(a–h) show a schematic plan of a lower substrate in some pixels of a liquid crystal display according to this invention.
Figure 5H:
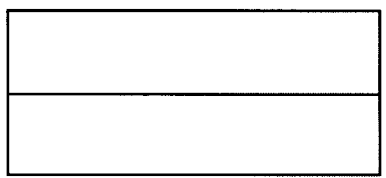
Figure 5C:
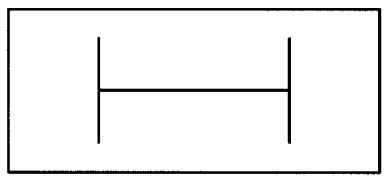
Figure 5G:
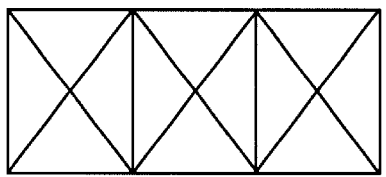
Figure 5B:
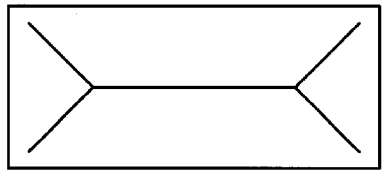
Figure 5F:
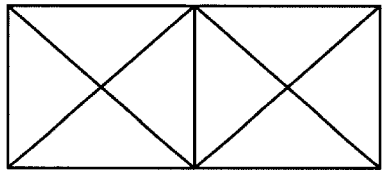
Figure 5A:
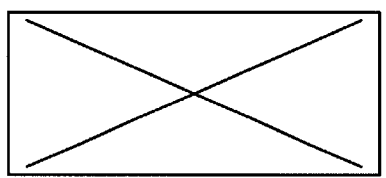
Figure 5E:
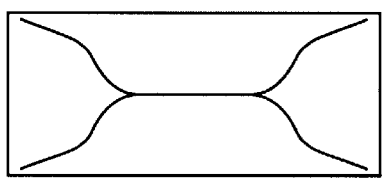
Figure 6A:
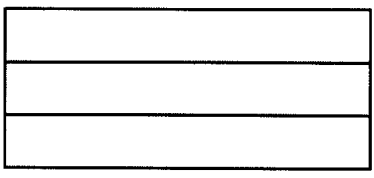
FIGS. 6(a–e) show a schematic plan of a lower substrate in some pixels of a liquid crystal display according to this invention.
Figure 6B:
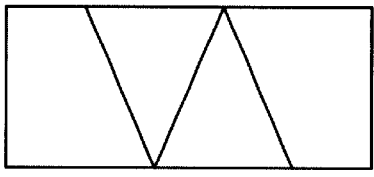
Figure 6C:
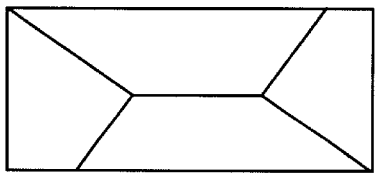

In an active device, a transverse electric field from a signal conductor transversely divides an oblong pixel. Therefore, when a control electrode is longitudinally formed as shown in FIGS. 5(h) and 6(a), the electric field from the control electrode and the transverse electric field cooperate to ensure the division. Since the configuration of the pixel is not completely symmetrical because of presence of the active device, it may be asymmetrically divided as shown in FIGS. 6(b) and (c).

Figure 6D:
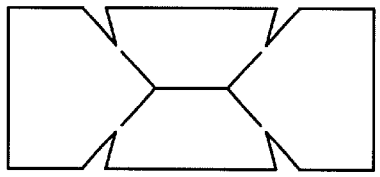
Figure 6E:
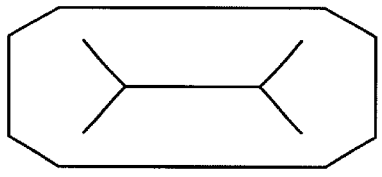

The liquid crystal display of this invention has a region without a pixel transparent electrode 22, i.e., the opening 24, in the layer on the control electrode 25 for generating an oblique electric field between the control electrode 25 and the common electrode 32. In this case, the region is preferably narrower than the control electrode for preventing a leak of light. It is not necessary that the region without a pixel transparent electrode 22, i.e., the opening, exactly corresponds to the overall control electrode; for example, the transparent electrode 22 may have notches in part as shown in FIG. 6(d) or may have areas under which the control electrode is absent as shown in FIG. 6(e).

In a more preferable embodiment of this invention, a vacant panel of a liquid crystal cell having a structure as shown in FIG. 1 is manufactured, into which a liquid crystal is then injected. Then, while applying a voltage to the control electrode 25 and the counter electrode 32, the cell is heated to a temperature equal to or higher than the isotropic phase-liquid crystal phase transition point of the liquid crystal and then cooled to a temperature lower than the transition point. Thus, the initial orientation of the liquid crystal can be more homogeneously controlled.

In a further embodiment of this invention, a vacant panel of a liquid crystal cell having a structure as shown in FIG. 1 is manufactured, into which a liquid crystal containing a small amount of monomer or oligomer is injected. Then, while applying a voltage to the control electrode 25 and the counter electrode 32, the monomer or oligomer is polymerized by light or heating. Thus, the initial orientation of the liquid crystal can be more reliable and more resistant to a physical shock during its use.

If necessary, before the polymerization process, the cell may be heated, as described above, to a temperature equal to or higher than the isotropic phase-liquid crystal phase transition point of the liquid crystal while applying a voltage, and cooled to a temperature lower than the transition point to make the orientation of the liquid crystal adequately homogeneous.

A liquid crystal cell may be prepared from a substrate subjected to usual treatment for divided orientation such as altering a rubbing direction and oblique radiation of a polarized light according to the structure of the control electrode. Then, applying a voltage to the control electrode 25 and the counter electrode 32 may firmly fix the dividing boundaries over all the surface of the panel, significantly improving its reliability. Reliability can be further improved by using a liquid crystal containing monomer or oligomer, forming a divided state and then conducting polymerization. The oriented film may be a common vertical oriented film when conducting rubbing, or may be a polymer prepared via polymerization of photosensitive groups by radiation of polarized light as described in, for example, AM-LCD '96/IDW '96 Digest of Technical Papers, p.337, when conducting oblique radiation of a polarized light.

Second Embodiment

Figure 2:
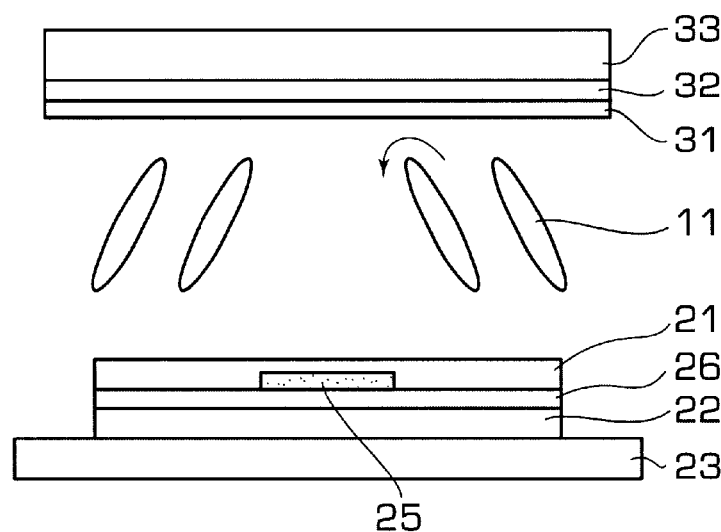
FIG. 2 shows a cross section of another liquid crystal display according to this invention.

In a further embodiment of this invention, second electrode for controlling the initial orientation of the liquid crystal is provided on one of the electrodes for driving the liquid crystal, via an insulating film, whose structure is shown in FIG. 2. This embodiment is similar to the first embodiment, except that the electrode 22 does not have an opening and the second electrode 25 is formed on the electrode 22 via the insulating film 26.

For this embodiment, in a liquid crystal display in which the liquid crystal is driven via an active device, it is desirable that second electrode for controlling the initial orientation of the liquid crystal is provided on the electrode of the substrate on the side of the active device according to the configuration of the electrode. In this configuration, by selecting an appropriate configuration of active device, additional photolithography steps are not necessary and regions in a pixel to which a voltage is not applied during driving may be significantly reduced in comparison with a display in which an opening is simply formed. Thus, it may give an excellent image in its contrast and numerical aperture.

In this embodiment, a liquid crystal is injected in a cell, and while applying a voltage to the control electrode 25 and the counter electrode 32, the cell is heated to a temperature equal to or higher than the isotropic phaseliquid crystal phase transition point of the liquid crystal and then cooled to a temperature lower than the transition point. Thus, the orientation of the liquid crystal can be more firmly controlled.

As in the first embodiment, a small amount of monomer or oligomer is added in the liquid crystal, and while applying a voltage to the second electrode 25 for controlling the initial orientation of the liquid crystal and the electrode 32 of the substrate, the monomer or oligomer is polymerized by radiation or heating to firmly control the orientation of the liquid crystal and to more reliably avoid disclination during driving.

Furthermore, by using a substrate subject to divided orientation according to the configuration of the second electrode by rubbing or light orientation, the orientation of the liquid crystal during dividing or driving the liquid crystal may be firmly controlled, leading to more reliable reduction of disclination during driving.

All or some of the above temperature-control, polymerization, rubbing and light orientation make it possible to more firmly control the orientation for providing an excellent image.

Third Embodiment

Figure 11:
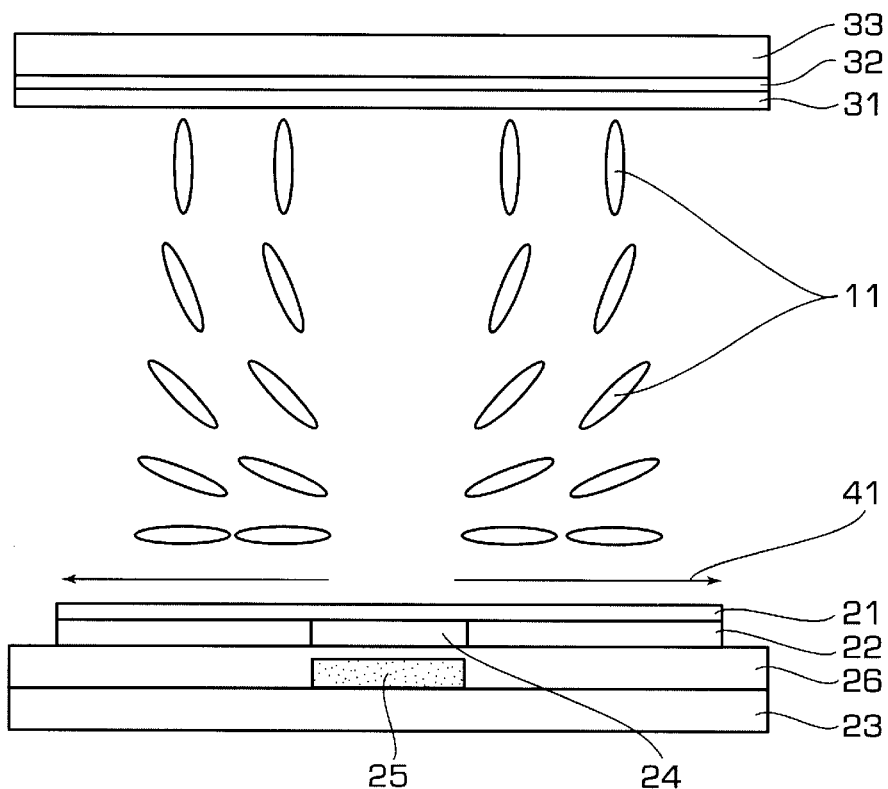
FIG. 11 shows a cross section of another liquid crystal display according to this invention.

In the liquid crystal display of this invention, a layer comprising liquid crystal molecules 11 is placed between two substrates 23, 33 which have an electrode 22 or 32, respectively, as shown in FIG. 11. On one electrode is formed a vertical oriented film 31, which may be, if necessary, rubbed. On the other electrode is applied an oriented film 21 which makes the liquid crystal oriented substantially parallel to the substrate surface and which may be, if necessary, rubbed. An opening 24 is formed in the electrode 22 on one substrate 23, and at the same position, second electrode 25 is formed for controlling the initial orientation of the liquid crystal. Different voltages may be applied to the electrode 22 and the second electrode 25.

In a conventional liquid crystal display which does not have the opening 24 or the second electrode 25, when a voltage is applied, liquid crystal molecules on the vertical oriented substrate side are tilted in a random direction, without rubbing treatment, while in the rubbing direction if it have been rubbed. Thus, a photoresist step or a polarized radiation step via a mask is necessary for dividing a direction to which the liquid crystal tilts. On the horizontal oriented substrate side, a pre-tilt angle is given to a rubbing direction, to which the liquid crystal molecules rise during voltage application. Therefore, the rising direction is limited to one of the directions. Thus, in this case, a photoresist step or a polarized radiation step via a mask is necessary for dividing a direction to which the liquid crystal rises. On the other hand, the liquid crystal display of this invention has the electrode 22 and also the second electrode 25 for controlling the initial orientation of the liquid crystal. An oblique field may be, therefore, generated in the liquid crystal layer by applying a voltage between the second electrode 25 and the electrode 32. Thus, the liquid crystal molecules 11 are tilted along the oblique field as shown in FIG. 11. Here, on the horizonally-oriented substrate side, the in-plane orientation direction of the liquid crystal is controlled by rubbing, and if using an oriented film whose pre-tilt angle is very small, preferably 0°, the orientation can be effectively controlled by an oblique field. The control electrode may be on either the vertical or horizontal oriented substrate side, and preferably on the horizontal oriented substrate side in the light of stability of the orientation.

Figure 14A:
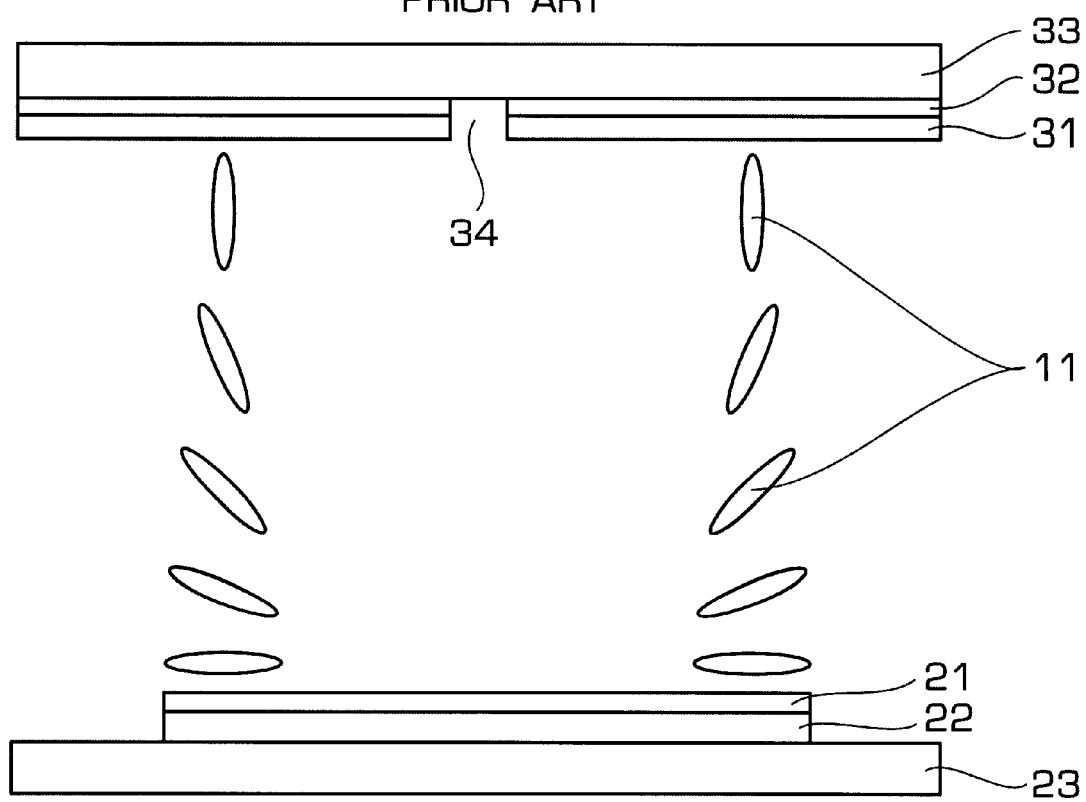
FIGS. 14(a–b) are an explanatory drawing of a liquid crystal display of the prior art.
Figure 14B:
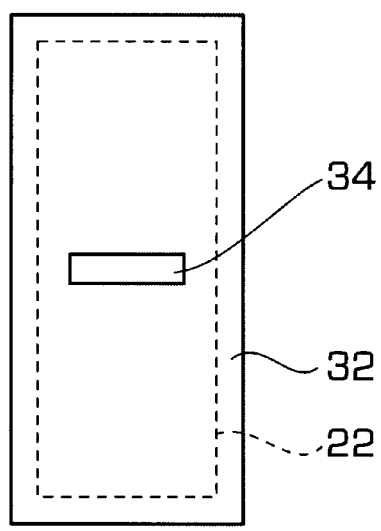

Dividing a liquid-crystal orientation utilizing an oblique field may be achieved by using an electrode provided with an opening as in a conventional display shown in FIG. 14. However, since an electrode is not formed in the region of the opening 34 as shown in FIG. 14 in the prior art, an adequate electric field is not applied in the region even when a voltage is applied to the electrode 32, and thus the liquid crystal may not adequately respond to the applied voltage.

Figure 15:
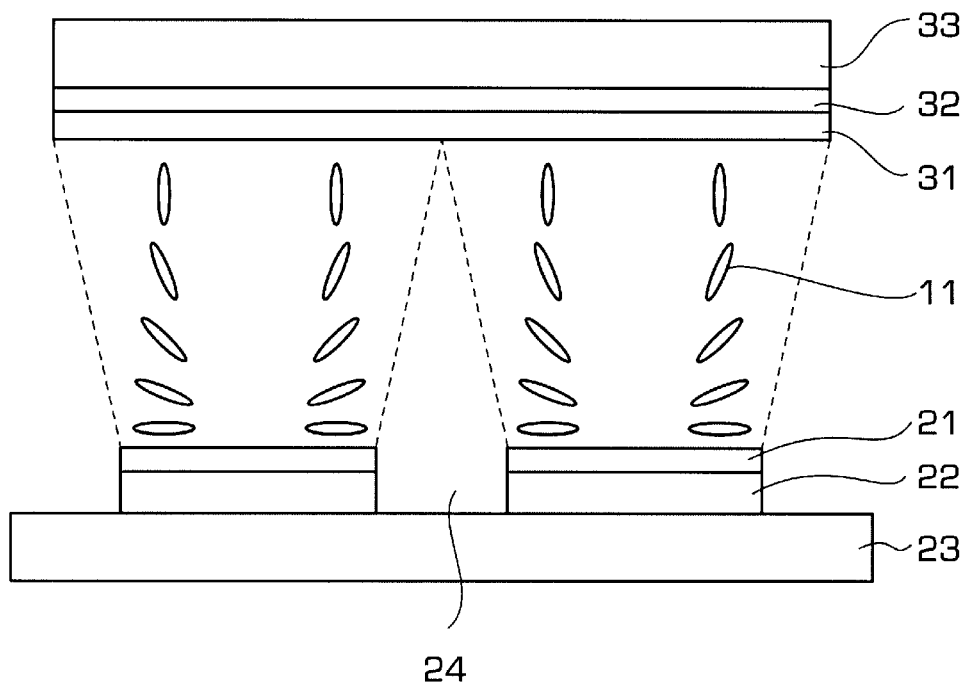
FIG. 15 shows a cross section of a liquid crystal display of the prior art.

We have found that a desired effect cannot be obtained only by forming an opening, particularly when driving with active devices. Specifically, in a common active device, an electrode on the side of the color filter (generally called as a "common electrode") may be formed over all the substrate surface without requiring a photoresist step. On the substrate on the side of active devices, a switching device is formed for each pixel and pixel electrodes are separated each other. In such a form of device, it is essential to form an opening in the common electrode for generating an oblique field based on difference in size between the upper and the lower electrodes, by which liquid crystal molecules are tilted in a divided manner. FIGS. 14 and 15 show cross sections of liquid crystal displays in which an opening is formed in a common electrode and an electrode on the side of the active device, respectively. As seen in FIG. 15, when the electrode 22 on the side of the active device is small, there may be generated regions with an opposite direction of tilt and not providing an oblique field between the electrodes. The regions may cause disclination and make a tilt direction of the liquid crystal uncontrollable. Thus, the display may fail to provide desired orientation for uniform display. It is, however, necessary to perform a photoresist step on the side of the common electrode for forming an opening in the common electrode. Such a manufacturing process requires a photoresist step which is not necessary for a conventional liquid crystal display, resulting in reduction of an yield and price-up.

Forming an opening in a pixel electrode on the side of the active device as in this invention requires changing a mask, but not an additional photoresist step. Since the procedure alone has a defect that there may be generated areas without an oblique electric field, second electrode for controlling the orientation of the liquid crystal is, therefore, formed in the region of the opening and then a voltage is applied to generate an oblique field.

The second electrode for controlling the orientation of the liquid crystal can be formed as a different layer from electrode layers such as a signal and a drain wire when the active device is prepared, but it is preferably formed on the same layer as any of the electrode layers. Thus, changing a mask alone may be adequate to generate a desired oblique field without an additional photoresist step. For example, an electrode layer constituting a gate electrode layer may be used as second electrode layer. The second electrode 25 provides a similar effect whether it is formed in the opening 24 while isolated from the electrode 22 or at the same position as the opening 24 via an insulating layer 26 (FIG. 11).

Figure 13A:
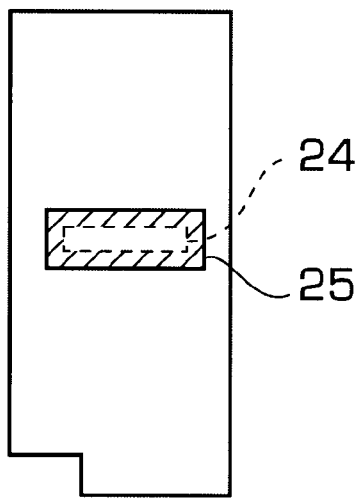
FIGS. 13(a–d) show a schematic plan of a lower substrate in some pixels of a liquid crystal display according to this invention.
Figure 13B:
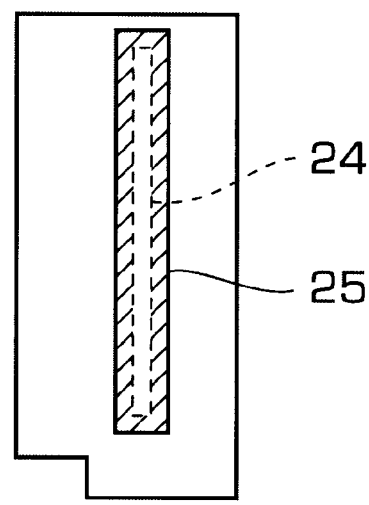
Figure 13C:
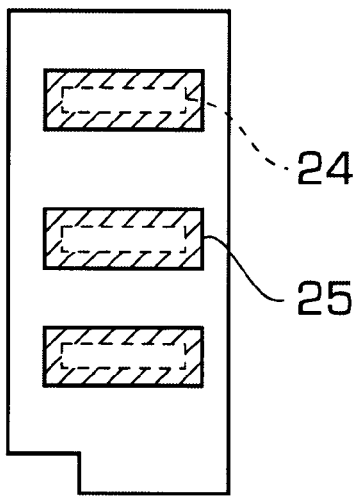
Figure 13D:
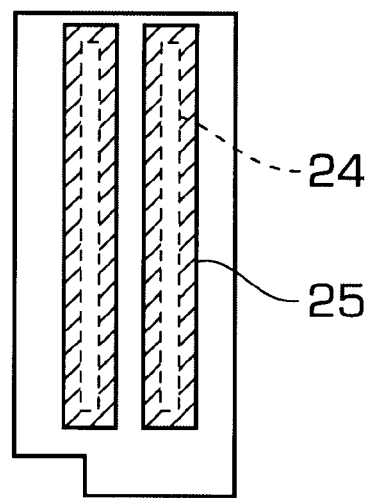

The control electrode (second electrode) in this invention basically has a shape of "—" having a part parallel to the narrow side of the pixel as shown in FIG. 13(a), but it may has a shape of "|" having a part parallel to the longitudinal side of the pixel as shown in FIG. 13(b) Furthermore, the finer the division is, the more effective the controlling field is, so that a shape comprising a plurality of "—"s or "|" as shown in FIG. 13(c) or 13(d) is more preferable. In the light of influence from a transverse direction, the electrodes may be formed in an oblique direction to the pixel or on the diagonal line. The "—"s or "|" electrodes may be connected, as a control electrode, with another control electrode or may be floating. In these figures, control electrodes of pixels are drawn as separated each other, for convenience. Practically, these are, however, connected with each other, by which a voltage can be simultaneously applied from an output terminal of a panel side.

In a more preferable embodiment of this invention, a vacant panel of a liquid crystal cell having a structure as shown in FIG. 11 is manufactured, into which a liquid crystal is then injected. Then, while applying a voltage to the control electrode 25 and the counter electrode 32, the cell is heated to a temperature equal to or higher than the isotropic phase-liquid crystal phase transition point of the liquid crystal and then cooled to a temperature lower than the transition point. Thus, the initial orientation of the liquid crystal can be more homogeneously controlled.

In a further embodiment of this invention, a vacant panel of a liquid crystal cell having a structure as shown in FIG. 11 is manufactured, into which a liquid crystal containing a small amount of monomer or oligomer is injected. Then, while applying a voltage to the control electrode 25 and the counter electrode 32, the monomer or oligomer is polymerized by light or heating. Thus, the initial orientation of the liquid crystal can be more reliable and more resistant to a physical shock during its use.

If necessary, before the polymerization process, the cell may be heated, as described above, to a temperature equal to or higher than the isotropic phase-liquid crystal phase transition point of the liquid crystal while applying a voltage, and cooled to a temperature lower than the transition point to make the orientation of the liquid crystal adequately homogeneous.

A liquid crystal cell may be prepared from a substrate subjected to usual treatment for divided orientation such as altering a rubbing direction and oblique radiation of a polarized light according to the structure of the control electrode. Then, applying a voltage to the control electrode 25 and the counter electrode 32 may firmly fix the dividing boundaries over all the surface of the panel, significantly improving its reliability. Reliability can be further improved by using a liquid crystal containing monomer or oligomer, forming a divided state and then conducting polymerization. The vertical oriented film formed on one substrate may be a common vertical oriented film when conducting rubbing, or may be a polymer prepared via polymerization of photo-sensitive groups by radiation of polarized light as described in, for example, AM-LCD '96/IDW '96 Digest of Technical Papers, p.337, when conducting oblique radiation of a polarized light.

Fourth Embodiment

Figure 12:
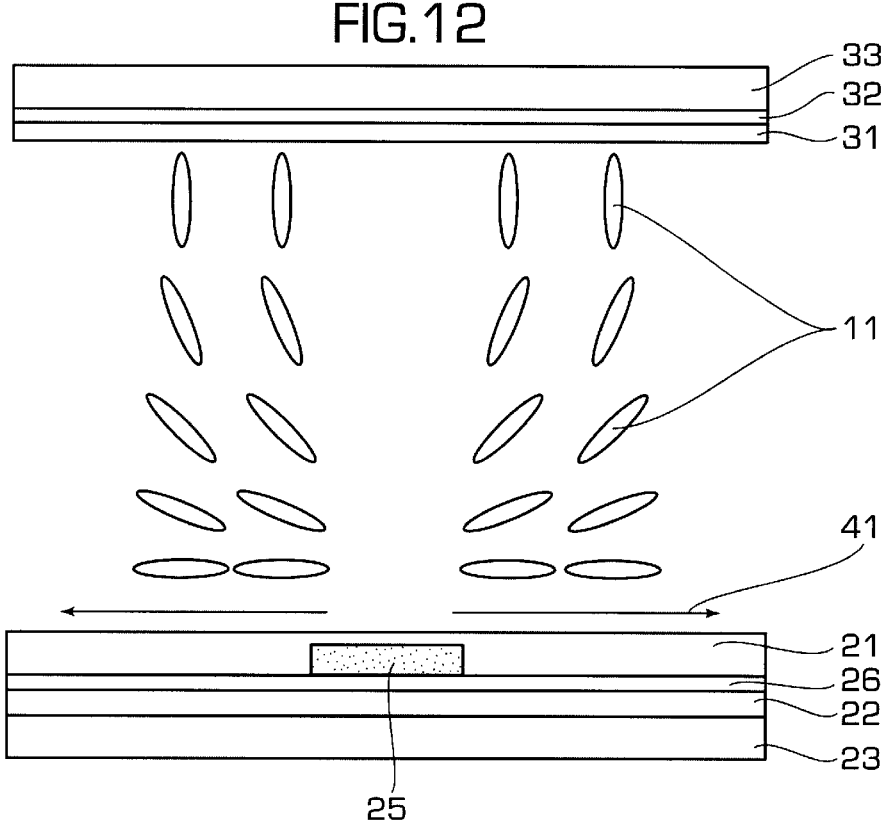
FIG. 12 shows a cross section of another liquid crystal display according to this invention.

In a further embodiment of this invention, second electrode for controlling the initial orientation of the liquid crystal is provided on one of the electrodes for driving the liquid crystal, via an insulating film, whose structure is shown in FIG. 12. This embodiment is similar to the third embodiment, except that the electrode 22 does not have an opening and the second electrode 25 is formed on the electrode 22 via the insulating film 26.

For this embodiment, in a liquid crystal display in which the liquid crystal is driven via an active device, it is desirable that second electrode for controlling the initial orientation of the liquid crystal is provided on the electrode of the substrate on the side of the active device according to the configuration of the electrode. In this configuration, by selecting an appropriate configuration of active device, additional photolithography steps are not necessary and regions in a pixel to which a voltage is not applied during driving may be significantly reduced in comparison with a display in which an opening is simply formed. Thus, it may give an excellent image in its contrast and numerical aperture.

In this embodiment, a liquid crystal is injected in a cell, and while applying a voltage to the control electrode 25 and the counter electrode 32, the cell is heated to a temperature equal to or higher than the isotropic phase-liquid crystal phase transition point of the liquid crystal and then cooled to a temperature lower than the transition point. Thus, the orientation of the liquid crystal can be more firmly controlled.

As in the third embodiment, a small amount of monomer or oligomer is added in the liquid crystal, and while applying a voltage to the second electrode 25 for controlling the initial orientation of the liquid crystal and the electrode 32 of the substrate, the monomer or oligomer is polymerized by radiation or heating to firmly control the orientation of the liquid crystal and to more reliably avoid disclination during driving.

Furthermore, by using a substrate subject to divided orientation according to the configuration of the second electrode by rubbing or light orientation, the orientation of the liquid crystal during dividing or driving the liquid crystal may be firmly controlled, leading to more reliable reduction of disclination during driving.

All or some of the above temperature-control, polymerization, rubbing and light orientation make it possible to more firmly control the orientation for providing an excellent image.

Fifth Embodiment

Figure 16:
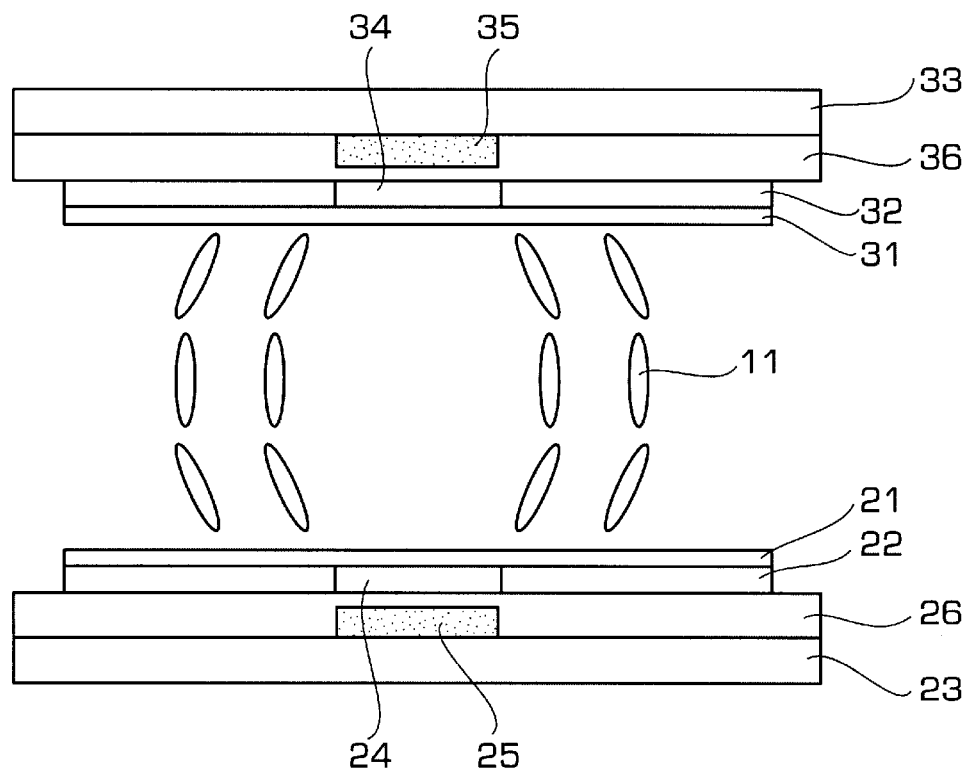
FIG. 16 shows a cross section of another liquid crystal display according to this invention.

In the liquid crystal display of this invention, a layer comprising liquid crystal molecules 11 is placed between two substrates 23, 33 which have an electrode 22 or 32, respectively, as shown in FIG. 16. On each electrode are formed oriented films 21 and 31, which are rubbed to the parallel direction. The electrodes 22 and 32 of the substrates 23 and 33 have an opening 24 and 34, respectively, and at the same position, have second electrodes 25 and 35, respectively, to control the initial orientation of the liquid crystal. Different voltages may be applied to the electrode 22, 32 and the second electrode 25, 35, respectively.

In a conventional liquid crystal display which does not have the openings 24 and 34 or the second electrode 25 and 35, when a voltage is applied between electrodes 22 and 32, the orientation is converted from spray to bend orientation, and the bending is determined by the pre-tilt direction of the oriented film, to a given direction. When the pre-tilt angle of the oriented film is small, the bending direction may not be uniquely determined, and thus there may coexist two regions different in their bending direction. On the other hand, the liquid crystal display of this invention has the second electrodes 25 and 35 for controlling the initial orientation of the liquid crystal. For example, an oblique electric field may be, therefore, generated in the liquid crystal layer by applying a voltage between the second electrode 25 and the electrode 32, and/or between the second electrode 35 and the electrode 22, which is higher than that applied to the electrodes 22 and 32. Thus, the liquid crystal molecules 11 are bent along the oblique field as shown in FIG. 16. The second electrodes can be formed in the opening via an insulating film or at the same position as the opening via an insulating film (FIG. 16), both of which give a substantially equivalent effect.

Since the display of this invention controls the pre-tilt direction of the liquid crystal as described above, it is desirable that the pre-tilt angle of the oriented film is small, preferably 0°.

The control electrode (second electrode) in this invention preferably has a part parallel to the narrow side of the pixel as shown in FIG. 13(a) in the light of a numerical aperture, but it may has a shape having a part parallel to the longitudinal side of the pixel as shown in FIG. 13(b). Furthermore, the finer the division is, the more effective the controlling field is, so that a shape comprising a plurality of control electrodes in a single pixel as shown in FIG. 13(c) or 13(d) is more preferable. In these figures, control electrodes of pixels are drawn as separated each other, for convenience. Practically, these are, however, connected with each other, by which a voltage can be simultaneously applied from an output terminal of a panel side.

In a more preferable embodiment of this invention, a vacant panel of a liquid crystal cell having a structure as shown in FIG. 16 is manufactured, into which a liquid crystal is then injected. Then, while applying a voltage to the control electrodes 25, 35 and the counter electrodes 32, 22, respectively, the cell is heated to a temperature equal to or higher than the isotropic phase-liquid crystal phase transition point of the liquid crystal and then cooled to a temperature lower than the transition point. Thus, the initial orientation of the liquid crystal can be more homogeneously controlled.

In a further embodiment of this invention, a vacant panel of a liquid crystal cell having a structure as shown in FIG. 16 is manufactured, into which a liquid crystal containing a small amount of monomer or oligomer is injected. Then, while applying a voltage to the control electrodes 25, 35 and the counter electrodes 32, 22, respectively, the monomer or oligomer is polymerized by light or heating. Thus, the initial orientation of the liquid crystal can be more reliable and more resistant to a physical shock during its use. Without such a processing, the orientation may again become spray orientation immediately after making the driving voltage between the electrodes 22 and 32 zero, and thus it is necessary to apply a voltage to the control electrode at every start. On the other hand, once the bend orientation is retained and fixed by polymerization, it may be sufficient for a subsequent drive only to supply a drive voltage between the electrodes 22 and 33.

If necessary, before the polymerization process, the cell may be heated, as described above, to a temperature equal to or higher than the isotropic phase-liquid crystal phase transition point of the liquid crystal while applying a voltage, and cooled to a temperature lower than the transition point to mike the orientation of the liquid crystal adequately homogeneous.

Sixth Embodiment

Figure 17:
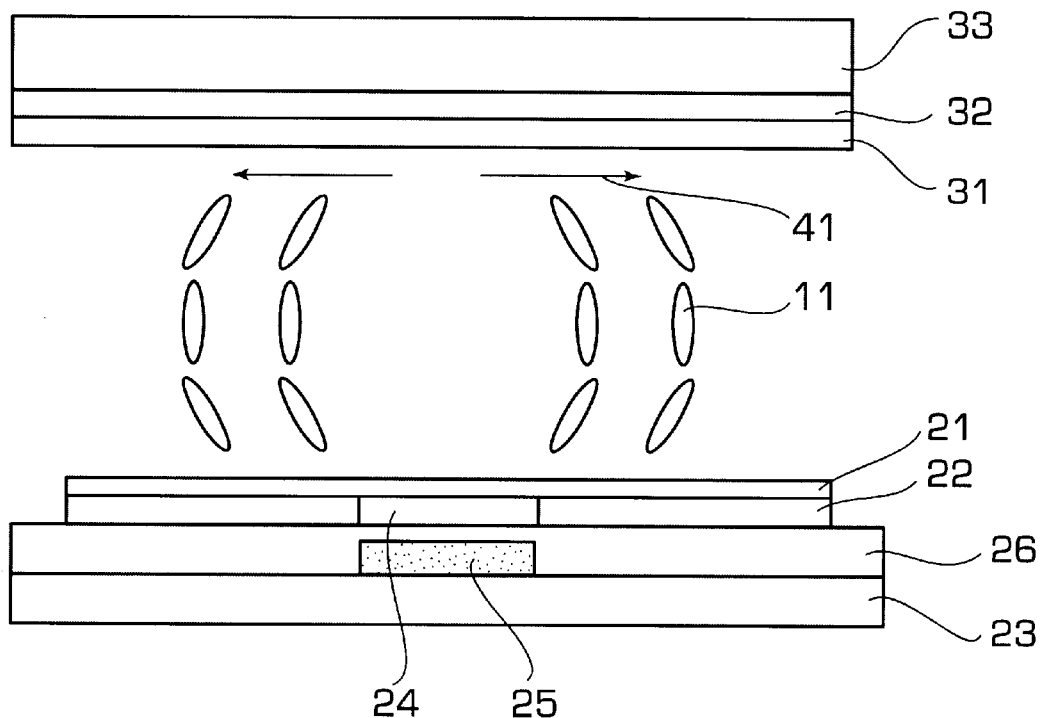
FIG. 17 shows a cross section of another liquid crystal display according to this invention.

Another embodiment of this invention has second electrode on one substrate for controlling the initial orientation of the liquid crystal, as shown in FIG. 17. The other substrate with no control electrodes is subject to usual orientation-dividing processing such as changing a rubbing direction using a photoresist process and polarized radiation from an oblique direction.

In such a panel, an oblique field may be generated by, for example, applying a higher voltage to the control electrode 25 and its counter electrode 32 than that applied to the electrodes 22 and 32. Thus, the liquid crystal near the substrate on the side of the opening 24 may rise along the oblique field. On the other hand, the liquid crystal molecules on the side of the substrate 33 with no openings may rise in a pre-tilt direction, which is divided into 2 directions. Since the oriented film 31 has been subject to rubbing and orientation dividing with a polarized light. Consequently, the liquid crystal molecules 11 are bent along the directions of the oblique field and of the orientation-dividing, as shown in FIG. 17. The second electrode can be formed in the opening via an insulating film or at the same position as the opening via an insulating film (FIG. 17), both of which give a substantially equivalent effect.

Again, since the pre-tilt direction of the liquid crystal is controlled by an electric field on the side of the oriented film 21, it is desirable that the pre-tilt angle of the oriented film is small, preferably 0°.

This embodiment is advantageous, especially when an active device is used, because the control electrode (second electrode) may be formed only on one substrate. In other words, the second electrode for controlling the orientation can be formed as a different layer from electrode layers such as a signal and a drain wire when the active device is prepared, but it may be formed on the same layer as any of the electrode layers. Thus, changing a mask alone may be adequate to generate a desired oblique field without an additional photoresist step. For example, an electrode layer constituting a gate electrode layer may be used as second electrode layer. The oriented film formed on the substrate with no control electrodes may be a common oriented film which may give a high pre-tilt angle when conducting rubbing, or may be a polymer prepared via polymerization of photosensitive groups by radiation of polarized light as described in, for example, AM-LCD '96/IDW '96 Digest of Technical Papers, p.337, when conducting oblique radiation of a polarized light.

As in the fifth embodiment, in a more preferable embodiment of this invention, a vacant panel of a liquid crystal cell having a structure as shown in FIG. 17 is manufactured, into which a liquid crystal is then injected. Then, while applying a voltage to the control electrode 25 and the counter electrode 32, the cell is heated to a temperature equal to or higher than the isotropic phase-liquid crystal phase transition point of the liquid crystal and then cooled to a temperature lower than the transition point. Thus, the initial orientation of the liquid crystal can be more homogeneously controlled.

As in the fifth embodiment, in a more preferable embodiment of this invention, a vacant panel of a liquid crystal cell having a structure as shown in FIG. 17 is manufactured, into which a liquid crystal containing a small amount of monomer or oligomer is injected. Then, while applying a voltage to the control electrode 25 and the counter electrode 32, the monomer or oligomer is polymerized by light or heating. Thus, the initial orientation of the liquid crystal can be more reliable and more resistant to a physical shock during its use. The bend orientation is also fixed.

If necessary, before the polymerization process, the cell may be heated, as described above, to a temperature equal to or higher than the isotropic phase-liquid crystal phase transition point of the liquid crystal, and cooled to a temperature lower than the transition point to make the orientation of the liquid crystal adequately homogeneous.

Seventh Embodiment

Figure 18:
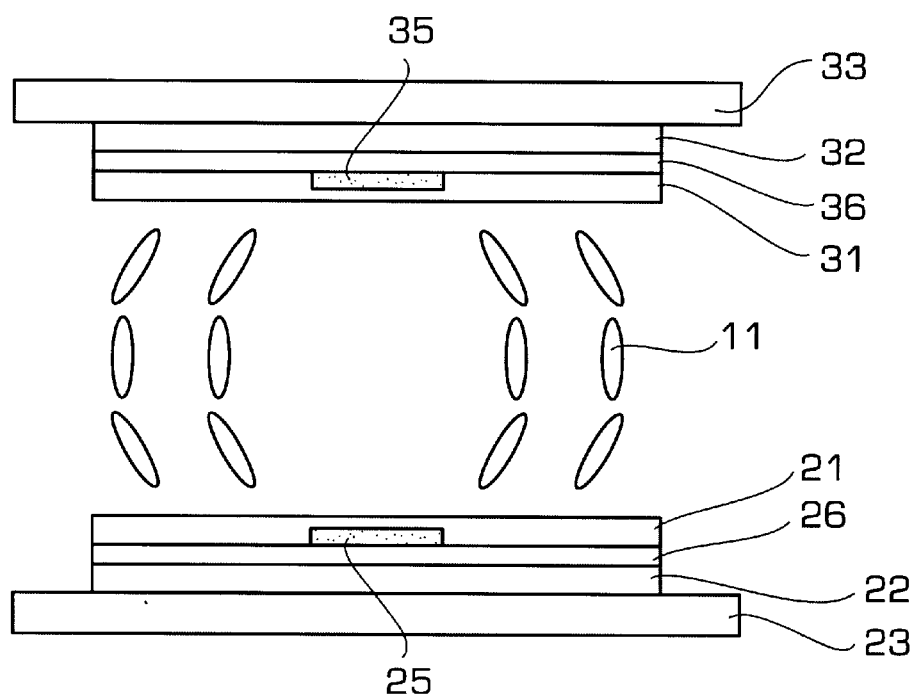
FIG. 18 shows a cross section of another liquid crystal display according to this invention.

In another embodiment of this invention, the second electrode for controlling the initial orientation of the liquid crystal is formed on the electrode for driving the liquid crystal via an insulating film, whose structure is shown in FIG. 18.

As in the fifth embodiment, since there are the second electrodes 25, 35 for controlling the initial orientation of the liquid crystal, an oblique electric field may be generated by applying a voltage between the second electrode 25 and the electrode 32 and/or the second electrode 35 and the electrode 22, which is higher than that applied to the electrodes 22 and 23, and the liquid crystal molecules 11 are bent along the direction of the oblique electric field as shown in FIG. 18. Again, since the pre-tilt direction of the liquid crystal is controlled by an electric field, it is desirable that the pre-tilt angle of the oriented film is small, preferably 0°.

Again, in this embodiment, a vacant panel is filled with liquid crystal, and then, while applying a voltage to the second electrode and its counter electrode, the panel is heated to a temperature equal to or higher than the isotropic phase-liquid crystal phase transition point of the liquid crystal and then cooled to a temperature lower than the transition point, to ensure the orientation of the liquid crystal.

As in the fifth embodiment, a small amount of monomer or oligomer is added in the liquid crystal, and while applying a voltage to the second electrode for controlling the initial orientation of the liquid crystal and the electrode of the counter substrate, the monomer or oligomer is polymerized by radiation or heating to firmly control the orientation of the liquid crystal and to more reliably avoid disclination during driving. Furthermore, as in the fifth embodiment, the bend orientation may be reliably fixed.

Eighth Embodiment

Figure 19:
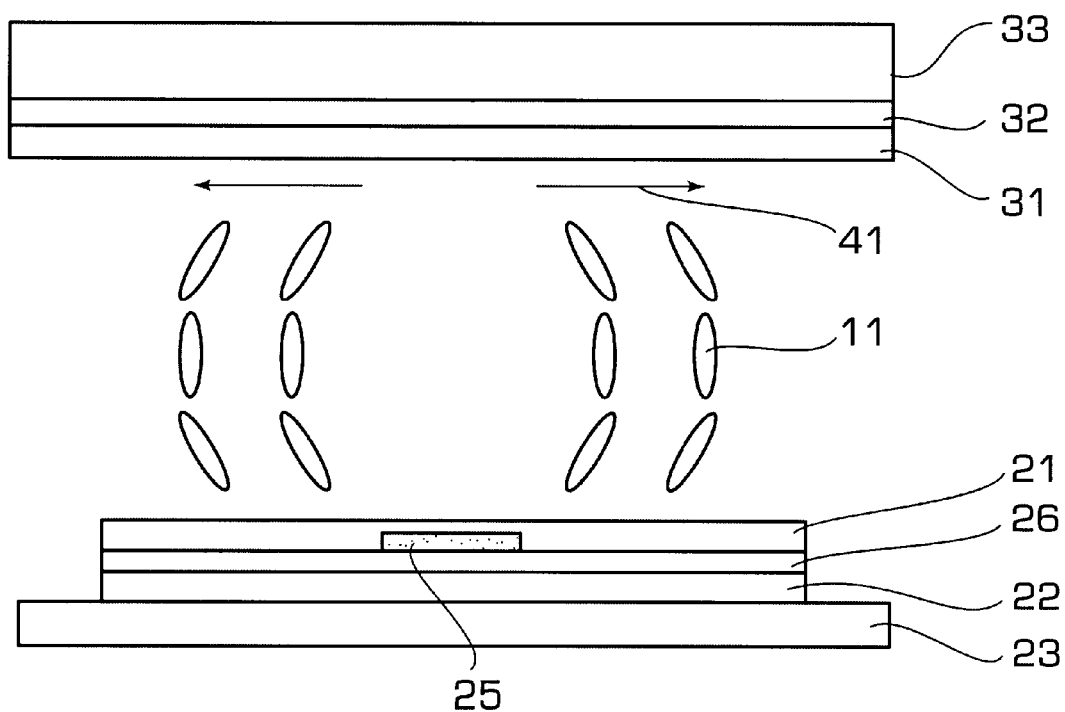
FIG. 19 shows a cross section of another liquid crystal display according to this invention.

In another embodiment of this invention, the second electrode 25 for controlling the initial orientation of the liquid crystal is formed on the electrode 22 for driving the liquid crystal via an insulating film 26, whose structure is shown in FIG. 19. As in the sixth embodiment, the substrate 33 with no control electrodes is subject to usual orientation-dividing treatment such as changing a rubbing direction by a photoresist process and radiating a polarized light from an oblique direction.

In such a panel, an oblique electric field may be generated by, for example, applying a higher voltage to the control electrode 25 and its counter electrode 32 than that applied to the electrodes 22 and 32. Thus, the liquid crystal near the substrate 23 on the side of the control electrode 25 may rise along the oblique electric field. On the other hand, the liquid crystal molecules on the side of the substrate 33 with no control electrodes may rise in a pre-tilt direction, which is divided into 2 directions. Since the oriented film 31 has been subject to rubbing the oriented film 31 and orientation dividing with a polarized light. Consequently, the liquid crystal molecules 11 are bent along the directions of the oblique electric field and of the orientation-dividing, as shown in FIG. 19. Again, since on the side of the oriented film 21 the pre-tilt direction of the liquid crystal is controlled by an electric field, it is desirable that the pre-tilt angle of the oriented film is small, preferably 0°.

As in the sixth embodiment, using a substrate which has been subject to orientation-dividing along the shape of the second electrode by, e.g., rubbing and light-orienting, the orientation of the liquid crystal during division of the liquid crystal or driving can be more rigid and disclination during driving can be more controlled.

If necessary, while applying a voltage to the second electrode 25 for controlling the initial orientation of the liquid crystal and the electrode 32 of the counter electrode, the panel is heated to a temperature equal to or higher than the isotropic phase-liquid crystal phase transition point of the liquid crystal and then cooled to a temperature lower than the transition point, to ensure the orientation control of the liquid crystal and provide an excellent quality of image.

Furthermore, a small amount of monomer or oligomer is added in the liquid crystal, and while applying a voltage to the second electrode for controlling the initial orientation of the liquid crystal and the electrode of the counter substrate, the monomer or oligomer is polymerized by radiation or heating to firmly control the orientation of the liquid crystal and to provide an excellent quality of image. Furthermore, as in the other embodiments, the bend orientation may be reliably fixed by polymerization.

The following examples will describe this invention more specifically.

EXAMPLE 1

On a glass substrate was formed an array of amorphous silicon thin layer transistor (TFT) in which the size of a pixel was 100 μm×300 μm, the number of the pixels was 480×640×3 and the diagonal size of the screen was 240 mm, by repeating film formation and lithography steps.

The TFT in this example had a reverse-staggered structure consisting of a gate (chromium) layer, an insulating (silicon nitride) layer, a semi-conductor (amorphous silicon) layer, a drain source (chromium) layer and a pixel (ITO; Indium Tin Oxide) layer from the substrate.

In the ITO layer of each pixel electrode was formed a "X" shape of opening with a diagonal width of 5 μm. Second electrode of chromium was formed with a shape of "X" corresponding to the opening. The second electrode was designed to allow a different voltage from that to the pixel region to be applied from outside. Since the second electrode was formed from chromium as was for the gate electrode, there was no need for additional steps, compared with a conventional manufacturing process.

A counter substrate for manufacturing the liquid crystal panel in this example was an RGB color filter substrate (See FIG. 1 for the basic configuration of this example).

These substrates were washed, to which a polyimide vertically-orientating agent (Nissan Kagaku; SE 1211) was then applied, and the substrates were baked at 90° C. for 15 min and then at 200° C. for 1 hour, to form the oriented films 21 and 31.

Then, an adhesive was applied around the substrates and latex beads with a size of 6 μm as a spacer were distributed. These substrates were precisely superposed and adhered together by pressure. The adhered substrates, i.e., the empty panel, were placed in a vacuum chamber. After vacuuming the chamber, a nematic liquid crystal with a negative dielectric anisotropy (Merck; MJ 95955) was injected. The liquid crystal had a refractive-index anisotropy, Δn, of 0.0773 and a dielectric anisotropy, Δε, of −3.3.

On the liquid crystal panel were adhered two sheets of polycarbonate stretch films in a manner that their stretch axes were perpendicular each other. A film which was substantially optically uniaxial and had a negative isotropy was adhered to the outer side of the substrate 33 of the liquid crystal panel, setting Δnd (retardation) of the film had the opposite signal to and the same value as that of the liquid crystal cell. On both sides of the liquid crystal panel were adhered two sheets of polarized films in a manner that their transmission axes were perpendicular each other, to prepare a liquid crystal display. Here, Δn is a refractive-index anisotropy, i.e., a difference between refractive indices in directions parallel and perpendicular to a molecular longitudinal axis, and d is a thickness.

While applying 8 V of voltage to the "X" shape of electrode and the counter electrode, the liquid crystal display was driven to display an image, where the voltage of pixel display was about 5.5 V. The liquid crystal display of this example did not indicate tone reversal in any direction, giving an excellent image.

Comparative Example 1

For comparison, a liquid crystal display was driven as described in Example 1, except that a voltage was not applied to the "X" shape of electrode. In this Comparative Example, the display indicated tone reversal and a number of after-images. Microscopy showed that there occurred a disclination in each pixel, which was changed with the passage of time immediately after applying the voltage.

EXAMPLE 2

A display panel was prepared as described in Example 1, except that a sequential-staggered structure of TFT was formed. On a glass substrate was formed an array of amorphous silicon thin layer transistor (TFT) in which the size of a pixel was 100 μm×300 μm, the number of the pixels was 480×640×3 and the diagonal size of the screen was 240 mm, by repeating film formation and lithography steps.

The TFT in this example had a sequential-staggered structure consisting of a pixel (ITO) layer, a drain source (chromium) layer, a semi-conductor (amorphous silicon) layer, an insulating (silicon nitride) layer, and a gate (chromium) layer from the substrate.

In the ITO layer of each pixel electrode was formed a "X" shape of opening with a diagonal width of 5 μm. An electrode of chromium was formed with a shape of "X" corresponding to the opening. The electrode was designed to allow a different voltage from that to the pixel region to be applied from outside. Since the electrode was formed from chromium as was for the gate electrode, there was no need for additional steps, compared with a conventional manufacturing process.

Then, a panel was assembled and a liquid crystal was injected to prepare a liquid crystal display, as described in Example 1.

While applying 8 V of voltage to the "X" shape of electrode and the counter electrode, the liquid crystal display was driven to display an image, where the voltage of pixel display was about 5 V. The liquid crystal display of this Example, as was in Example 1, did not indicate tone reversal in any direction, giving an excellent image.

Comparative Example 2

For comparison, a liquid crystal display was driven as described in Example 2, except that a voltage was not applied to the "X" shape of electrode during applying a voltage. The dividing status of the four regions was irregular and roughness in an oblique direction was macroscopically observed.

EXAMPLE 3

A TFT substrate was prepared as described in Example 1. The substrate and a color filter substrate were assembled into an empty panel. The adhered substrates,i.e.,the empty panel, was placed in a vacuum chamber. After vacuuming, into the empty panel was injected a liquid crystal solution consisting of a nematic liquid crystal with a negative dielectric anisotropy (Merck; MJ 95955), a UV-curable monomer (Nippon Kayaku; KAYARAD PET-30; 0.2 wt % to the liquid crystal) and an initiator (Tokyo Kasei; benzoin methyl ether; 5 wt % to the monomer).

The display panel was heated to 110° C. and Uv(0.1 mW/cm$^2$) was radiated for 30 min. Then, while applying a sinusoidal voltage of 10 V and 5 Hz to the "X" shape of electrode and a sinusoidal voltage of 5 V and 5 Hz to the pixel, the substrate was cooled at the rate of 20° C./min.

Polarization-microscopy of the liquid cell indicated that each section was divided into 4 micro-regions according to the shape "X" of electrode. Variation of brightness when tilting the cell showed that the four micro-regions had the orientation shown in FIG. 1.

To the liquid cell were adhered an optical compensator and a polarizing plate, to prepare a liquid crystal display. Then, without applying a voltage to the "X" shape of electrode of the liquid crystal display, an image was displayed as usual. As a result, it showed an excellent display without tone reversal in a half tone and with a wide angle of visibility. It was evaluated by measuring its angle of visibility during gradation display at an interval of the azimuth angle of 45°, with a liquid-crystal evaluation apparatus (Otsuka Denshi; LCD-5000), indicating that it provided almost equivalent properties for an angle of visibility in all directions without tone reversal.

EXAMPLE 4

An empty panel was prepared as described in Example 3, into which a mixture of a liquid crystal, a UV-curable monomer and an initiator was injected. A rectangular-wave voltage of 40 V and 1 Hz was applied to the "X" shape of electrode of the display panel at room temperature, maintaining the pixel electrode of the counter substrate and the drain and the gate wires at 0 V, while UV (0.1 mW/cm$^2$) was radiated for 1 hour from a high-pressure mercury-vapor lamp.

Polarization-microscopy of the cell indicated that each section was divided into 4 micro-regions according to the shape "X" of electrode. Variation of brightness when tilting the cell showed that the four micro-regions had the orientation shown in FIG. 1.

To the liquid crystal cell were adhered an optical compensator and a polarizing plate, to prepare a liquid crystal display. Without applying a voltage to the "X" shape of electrode of the liquid crystal display, an image was displayed as usual. It showed an excellent display without tone reversal in a half tone and with a wide angle of visibility. It was evaluated by measuring its angle of visibility during gradation display at an interval of the azimuth angle of 45°, with a liquid-crystal evaluation apparatus (Otsuka Denshi; LCD-5000), indicating that it provided almost equivalent properties for an angle of visibility in all directions without tone reversal.

EXAMPLE 5

Figure 4:
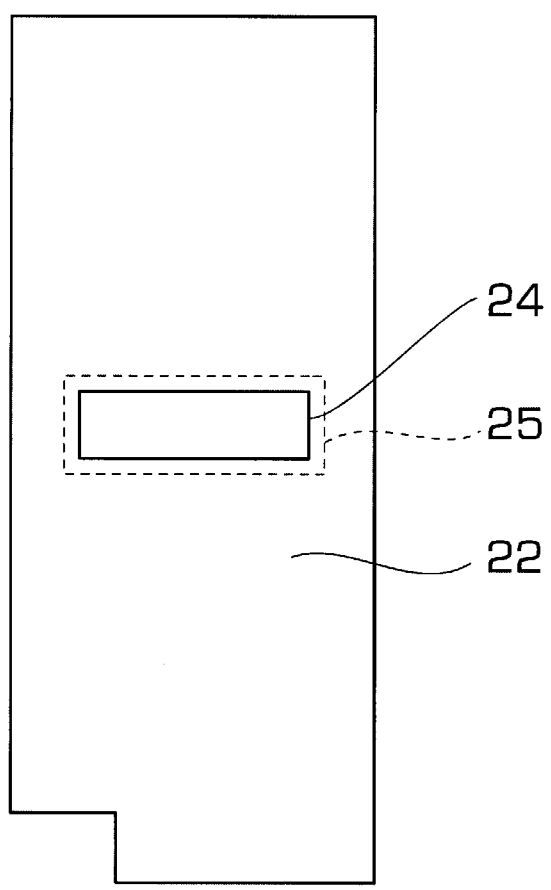
FIG. 4 shows a schematic plan of a lower substrate in a pixel of a liquid crystal display according to this invention.

A liquid crystal display was prepared as described in Example 4, except that the rectangular opening 24 as shown in FIG. 4 was formed in the center of the pixel and the control electrode 25 had a "—" shape. A rectangular-wave voltage of 40 V and 1 Hz was applied to the "—" shape of electrode as described in Example 4, maintaining the pixel electrode of the counter substrate and the drain and the gate wires at 0 V, while UV (0.1 mW/cm$^2$) was radiated for 1 hour from a high-pressure mercury-vapor lamp.

Polarization-microscopy of the liquid crystal cell indicated that each section was divided into 2 micro-regions according to the shape "—" of electrode. Variation of brightness when tilting the cell showed that the two micro-regions had the orientation shown in FIG. 1.

To the cell were adhered an optical compensator and a polarizing plate, to prepare a liquid crystal display. Without applying a voltage to the "—" shape of electrode of the liquid crystal display, an image was displayed as usual. It showed an excellent display without tone reversal in a half tone and with a wide angle of visibility. It was evaluated by measuring its angle of visibility during gradation display at an interval of the azimuth angle of 45°, with a liquid-crystal evaluation apparatus (Otsuka Denshi; LCD-5000), indicating that it provided almost equivalent properties for an angle of visibility in all directions without tone reversal.

EXAMPLE 6

An empty panel was prepared as described in Example 2, into which a mixture of a liquid crystal, a UV-curable monomer and an initiator was injected as in Example 4, and the monomer was cured with UV.

Polarization-microscopy of the cell indicated that each section was divided into 4 micro-regions according to the shape "X" of electrode. Variation of brightness when tilting the cell showed that the four micro-regions had the orientation shown in FIG. 2.

To the liquid crystal cell were adhered an optical compensator and a polarizing plate, to prepare a liquid crystal display. Without applying a voltage to the "X" shape of electrode of the liquid crystal display, an image was displayed as usual. It showed an excellent display without tone reversal in a half tone and with a wide angle of visibility. It was evaluated by measuring its angle of visibility during gradation display at an interval of the azimuth angle of 45°, with a liquid-crystal evaluation apparatus (Otsuka Denshi; LCD-5000), indicating that it provided almost equivalent properties for an angle of visibility in all directions without tone reversal.

EXAMPLE 7

To a substrate having a TFT as described in Example 1 was applied a polyimide vertically-orientating agent, which was then baked to give an oriented film. Using a photoresist process only to the substrate on the side of the TFT device, each region of the pixel was provided with divided orientation by rubbing in a manner that the tilt direction of the liquid crystal corresponded to the rubbing direction during applying a voltage to the control electrode.

As described in Example 1, a spacer agent was then distributed, these substrates were superposed to prepare a vacant panel, in which a liquid crystal was then injected. Then, a compensator and a polarizing film were adhered to prepare a liquid crystal display.

While applying 8 V of voltage to the "X" shape of electrode and the counter electrode, the liquid crystal display was driven to display an image as usual, where the voltage of pixel display was about 5.5 V. The liquid crystal display of this example did not indicate tone reversal in any direction, giving an excellent image. In addition, a disclination was not observed.

EXAMPLE 8

An empty panel was prepared as described in Example 4, into which a mixture of a liquid crystal, a UV-curable monomer and an initiator was injected. Then while applying a voltage as described in Example 4, all the surface of the panel was pressed with a roller and was irradiated with UV.

The cell was observed by polarization-microscopy as described in Example 4, and an optical compensator and a polarization plate were adhered to prepare a liquid crystal display, with which an image was displayed.

Each section was divided into 4 micro-regions according to the "X" shape of electrode as was in Example 4. There was not observed bending of a division boundary, which was observed in some pixels in Example 4. It gave an excellent image without tone reversal in any direction and with a wide angle of visibility.

EXAMPLE 9

An empty panel was prepared as described in Example 2, into which a mixture of a liquid crystal, a UV-curable monomer and an initiator was injected as described in Example 4. Then while applying a voltage as described in Example 4, all the surface of the panel was scanned with an ultrasonic generator. Then UV was radiated as described in Example 4.

The cell was observed by polarization-microscopy as described in Example 4, and an optical compensator and a polarization plate were adhered to prepare a liquid crystal display, with which an image was displayed.

Each section was divided into 4 micro-regions according to the "X" shape of electrode as was in Example 4. There was not observed bending of a division boundary, which was observed in some pixels in Example 4. It gave an excellent image without tone reversal in any direction and with a wide angle of visibility.

EXAMPLE 10

On a glass substrate was formed an array of amorphous silicon thin layer transistor (TFT) in which the size of a pixel was 100 μm×300 μm, the number of the pixels was 480× 640×2 and the diagonal size of the screen was 240 mm, by repeating film formation and lithography steps.

The TFT in this example had a reverse-staggered structure consisting of a gate (chromium) layer, an insulating (silicon nitride) layer, a semi-conductor (amorphous silicon) layer, a drain source (chromium) layer and a pixel (ITO) layer from the substrate.

In the ITO layer of each pixel electrode was formed a "—" shape of opening with a width of 5 μm (FIG. 13(a)). An electrode of chromium was formed with a shape of "—" corresponding to the opening. The second electrode was designed to allow a different voltage from that to the pixel region to be applied from outside. Since the second electrode was formed from chromium as was for the gate electrode, there was no need for additional steps, compared with a conventional manufacturing process.

A counter substrate for the liquid crystal panel in this example was an RGB color filter substrate (See FIG. 11 for the basic configuration of this example).

These substrates were washed, a polyimide vertically-orientating agent (Nissan Kagaku; SE 1211) was then applied to the substrate on the side of the color filter, and the substrate was baked at 90° C. for 15 min and then at 200° C. for 1 hour, to form the oriented film 31. Polyimide (JSR; JALS428) was applied to the substrate on the side of the TFT, and the substrate was baked at 90° C. for 15 min and then at 200° C. for 1 hour, to form the oriented film 21. The oriented film 21 of the substrate on the TFT was rubbed in a direction parallel to the longitudinal side of the "—" shape of electrode. In the oriented film, the liquid crystal was oriented vertically to the rubbing direction, and the pre-tilt angle was almost zero.

Then, an adhesive was applied around the substrates and latex beads with a size of 6 μm as a spacer were distributed. These substrates were precisely superposed and adhered together by pressure. The adhered substrates, i.e., the empty panel, were placed in a vacuum chamber. After vacuuming the chamber, a common nematic liquid crystal from which a chiral agent had been removed was injected.

On the liquid crystal panel were adhered two sheets of polycarbonate stretch films in a manner that their stretch axes were perpendicular each other. A film which was substantially optically uniaxial and had a negative isotropy was adhered to the outer side of the substrate 33 of the liquid crystal panel, setting And of the film had the opposite signal to and the same absolute value as that of the liquid crystal cell. On both sides of the liquid crystal panel were adhered two sheets of polarized films in a manner that their transmission axes were perpendicular each other, to prepare a liquid crystal display.

While applying 8 V of voltage to the "—" shape of electrode and the counter electrode, the liquid crystal display was driven to display an image, where the voltage of pixel display was about 5.5 V. The liquid crystal display of this example did not indicate tone reversal in any direction, giving an excellent image.

Comparative Example 3

For comparison, a liquid crystal display was driven as described in Example 10, except that a voltage was not applied to the "—" shape of electrode. In this Comparative Example, the display exhibited a number of after-images. In addition, roughness was found by observation from an oblique direction. Microscopy showed that there occurred a disclination in each pixel, which was changed with the passage of time immediately after applying the voltage.

EXAMPLE 11

A display panel was prepared as described in Example 10, except that a sequential-staggered structure of TFT was formed. On a glass substrate was formed an array of amorphous silicon thin layer transistor (TFT) in which the size of a pixel was 100 μm×300 μm, the number of the pixels was 480×640×2 and the diagonal size of the screen was 240 mm, by repeating film formation and lithography steps.

The TFT in this example had a sequential-staggered structure consisting of a pixel (ITO) layer, a drain source (chromium) layer, a semi-conductor (amorphous silicon) layer, an insulating (silicon nitride) layer, and a gate (chromium) layer from the substrate.

In the ITO layer of each pixel electrode was formed a "—" shape of opening with a width of 5 μm. An electrode of chromium was formed with a shape of "—" corresponding to the opening. The electrode was designed to allow a different voltage from that to the pixel region to be applied from outside. Since the electrode was formed from chromium as was for the gate electrode, there was no need for additional steps, compared with a conventional manufacturing process.

Then, a panel was assembled and a liquid crystal was injected to prepare a liquid crystal display, as described in Example 10.

While applying 8 V of voltage to the "—" shape of electrode and the counter electrode, the liquid crystal display was driven to display an image, where the voltage of pixel display was about 5 V. The liquid crystal display of this Example, as was in Example 10, did not indicate tone reversal in any direction, giving an excellent image.

Comparative Example 4

For comparison, a liquid crystal display was driven as described in Example 11, except that a voltage was not applied to the "—" shape of electrode during applying a voltage. The dividing status of the two regions was irregular and afterimages and roughness in an oblique direction were observed.

EXAMPLE 12

A TFT substrate was prepared as described in Example 10. The substrate and a color filter substrate were assembled into an empty panel. The adhered substrates, i.e., the empty panel, was placed in a vacuum chamber. After vacuuming, into the empty panel was injected a liquid crystal solution consisting of a nematic liquid crystal whose chiral agent had been removed, a UV-curable monomer (Nippon Kayaku; KAYARAD PET-30; 1.0 wt % to the liquid crystal) and an initiator (Ciba-Geigy; Irganox 907; 5 wt % to the monomer).

The display panel was heated to 110° C. and UV(0.1 mW/cm$^2$) was radiated for 30 min. Then, while applying a sinusoidal voltage of 10 V and 5 Hz to the "—" shape of electrode and a sinusoidal voltage of 5 V and 5 Hz to the pixel, the substrate was cooled at the rate of 1° C./min.

Polarization-microscopy of the liquid cell indicated that each section was divided into 2 micro-regions according to the shape "—" of electrode. Variation of brightness when tilting the cell showed that the two micro-regions had the orientation shown in FIG. 11.

To the liquid cell were adhered an optical compensator and a polarizing plate, to prepare a liquid crystal display. Then, without applying a voltage to the "—" shape of electrode of the liquid crystal display, an image was displayed as usual. As a result, it showed an excellent display without tone reversal in a half tone and with a wide angle of visibility. It was evaluated by measuring its angle of visibility during gradation display at an interval of the azimuth angle of 45°, with a liquid-crystal evaluation apparatus (Otsuka Denshi; LCD-5000), indicating that it provided almost equivalent properties for an angle of visibility in all directions without tone reversal.

EXAMPLE 13

An empty panel was prepared as described in Example 12, into which a mixture of a liquid crystal, a UV-curable monomer and an initiator was injected. A rectangular-wave voltage of 40 V and 1 Hz was applied to the "—" shape of electrode of the display panel at room temperature, maintaining the pixel electrode of the counter substrate and the drain and the gate wires at 0 V. Then UV (0.1 mW/cm$^2$) was radiated for 1 hour from a high-pressure mercury-vapor lamp, applying a voltage of 15 V, 30 Hz to the "—" shape of electrode.

Polarization-microscopy of the cell indicated that each section was divided into 2 micro-regions according to the shape "—" of electrode. Variation of brightness when tilting the cell showed that the two micro-regions had the orientation shown in FIG. 11.

To the liquid crystal cell were adhered an optical compensator and a polarizing plate, to prepare a liquid crystal display. Without applying a voltage to the "—" shape of electrode of the liquid crystal display, an image was displayed as usual. It showed an excellent display without tone reversal in a half tone and with a wide angle of visibility. It was evaluated by measuring its angle of visibility during gradation display at an interval of the azimuth angle of 45°, with a liquid-crystal evaluation apparatus (Otsuka Denshi; LCD-5000), indicating that it provided almost equivalent properties for an angle of visibility in all directions without tone reversal.

EXAMPLE 14

A liquid crystal display was prepared as described in Example 13, except that the rectangular opening 24 as shown in FIG. 13(*b*) was formed in the center of the pixel and the control electrode 25 had a "|" shape according to the shape of the opening. A rectangular-wave voltage of 40 V and 1 Hz was applied to the "|" shape of electrode as described in Example 13, maintaining the pixel electrode of the counter substrate and the drain and the gate wires at 0 V. Then UV (0.1 mW/cm$^2$) was radiated for 1 hour from a high-pressure mercury-vapor lamp, applying a voltage of 10 V, 30 Hz to the "|" shape of electrode.

Polarization-microscopy of the liquid crystal cell indicated that each section was divided into 2 micro-regions according to the shape "|" of electrode. Variation of brightness when tilting the cell showed that the two micro-regions had the orientation shown in FIG. 11.

To the cell were adhered an optical compensator and a polarizing plate, to prepare a liquid crystal display. Without applying a voltage to the "|" shape of electrode of the liquid crystal display, an image was displayed as usual. It showed an excellent display without tone reversal in a half tone and with a wide angle of visibility. It was evaluated by measuring its angle of visibility during gradation display at an interval of the azimuth angle of 45°, with a liquid-crystal evaluation apparatus (Otsuka Denshi; LCD-5000), indicating that it provided almost equivalent properties for an angle of visibility in all directions without tone reversal.

EXAMPLE 15

An empty panel was prepared as described in Example 11, into which a mixture of a liquid crystal, a UV-curable monomer and an initiator was injected as in Example 13, and the monomer was cured with UV.

Polarization-microscopy of the cell indicated that each section was divided into 2 micro-regions according to the shape "—" of electrode. Variation of brightness when tilting the cell showed that the four micro-regions had the orientation shown in FIG. 11.

To the liquid crystal cell were adhered an optical compensator and a polarizing plate, to prepare a liquid crystal display. Without applying a voltage to the "—" shape of electrode of the liquid crystal display, an image was displayed as usual. It showed an excellent display without tone reversal in a half tone and with a wide angle of visibility. It was evaluated by measuring its angle of visibility during gradation display at an interval of the azimuth angle of 45°, with a liquid-crystal evaluation apparatus (Otsuka Denshi; LCD-5000), indicating that it provided almost equivalent properties for an angle of visibility in all directions without tone reversal.

EXAMPLE 16

Using a TFT substrate as described in Example 10, to the substrate of the color filter side was applied a polyimide vertically-orientating agent, which was then baked, to give an oriented film and then to the TFT side substrate was a horizontally-orientating agent, which was then baked, to give an oriented film. Using a photoresist process only to the substrate on the side of the TFT device, each region of the pixel was provided with divided orientation by rubbing in a manner that the tilt direction of the liquid crystal corresponded to the rubbing direction during applying a voltage to the control electrode.

As described in Example 10, a spacer agent was then distributed, these substrates were superposed to prepare a vacant panel, in which a liquid crystal was then injected. Then, a compensator and a polarizing film were adhered to prepare a liquid crystal display.

While applying 8 V of voltage to the "—" shape of electrode and the counter electrode, the liquid crystal display was driven to display an image as usual, where the voltage of pixel display was about 5.5 V. The liquid crystal display of this example did not indicate tone reversal in any direction, giving an excellent image. In addition, a disclination was not observed.

EXAMPLE 17

On a glass substrate was formed an array of amorphous silicon thin layer transistor (TFT) in which the size of a pixel was 100 $\mu$m×300 $\mu$m, the number of the pixels was 480×640×3 and the diagonal size of the screen was 240 mm, by repeating film formation and lithography steps.

The TFT in this example had a reverse-staggered structure consisting of a gate (chromium) layer, an insulating (silicon nitride) layer, a semi-conductor (amorphous silicon) layer, a drain source (chromium) layer and a pixel (ITO) layer from the substrate.

In the ITO of each pixel electrode was formed a "—" shape of opening which was parallel to the narrow side and has a width of 5 $\mu$m, almost at the center of the pixel. An electrode of chromium was formed with a shape of "—" corresponding to the opening. The second electrode was designed to allow a different voltage from that to the pixel region to be applied from outside. Since the second electrode was formed from chromium as was for the gate electrode, there was no need for additional steps, compared with a conventional manufacturing process.

A counter substrate was an RGB color filter substrate. On the color filter substrate was vapor-deposited a chromium layer before forming an ITO, and a photolithography process was conducted to form a "—" shape of control electrode at the same position as the control electrode of the TFT substrate. Then, an ITO was deposited via an insulating film, and then an opening was formed, which was matched with this control electrode, by photolithography to form an electrode 32 (See FIG. 16 for the basic configuration of this example).

These substrates were washed, a polyimide vertically-orientating agent (JSR; JALS-428) with a pretilt angle of 0° was then applied to the substrates, and the substrates were baked at 90° C. for 15 min and then at 200° C. for 1 hour, to form the oriented films 21, 31. In this oriented film, the liquid crystal was aligned in a direction perpendicular to the rubbing direction. Rubbing was conducted in a direction substantially parallel to the narrow side of the pixel, in a manner that the rubbing directions are parallel between upper and lower substrates.

Then, an adhesive was applied around the substrates and latex beads with a size of 6 $\mu$m as a spacer were distributed. These substrates were precisely superposed and adhered together by pressure. The adhered substrates, i.e., the empty panel, were placed in a vacuum chamber. After vacuuming the chamber, a nematic liquid crystal without a chiral agent was injected.

On the liquid crystal panel were adhered two sheets of polycarbonate stretch films in a manner that their stretch axes were perpendicular each other. A film which was substantially optically uniaxial and had a negative isotropy was adhered to the outer side of the liquid crystal panel, setting And of the film had the opposite signal to and the same absolute value as that of the liquid crystal cell. Two sheets of polarized films were adhered on it in a manner that their transmission axes were perpendicular each other, to prepare a liquid crystal display.

While applying 8 V of voltage to the "—" shape of electrodes of the upper and the lower substrates and the counter electrodes, the liquid crystal display was driven to display an image, where the voltage of pixel display was about 5.5 V. The liquid crystal display of this example did not indicate tone reversal in any direction, giving an excellent image. In addition, the response speed was found to be much higher than an ordinary TN cell.

Comparative Example 5

For comparison, a liquid crystal display was driven as described in Example 17, except that a voltage was not applied to the "—" shape of electrode. In this Comparative Example, the display exhibited a number of after-images. Microscopy showed that there occurred a disclination in each pixel, which was changed with the passage of time immediately after applying the voltage.

EXAMPLE 18

A display panel was prepared as described in Example 17, except that a sequential-staggered structure of TFT was formed. On a glass substrate was formed an array of amorphous silicon thin layer transistor (TFT) in which the size of a pixel was 100 $\mu$m×300 $\mu$m, the number of the pixels was 480×640×3 and the diagonal size of the screen was 240 mm, by repeating film formation and lithography steps.

The TFT in this example had a sequential-staggered structure consisting of a pixel (ITO) layer, a drain source (chromium) layer, a semi-conductor (amorphous silicon) layer, an insulating (silicon nitride) layer, and a gate (chromium) layer from the substrate.

In the ITO layer of each pixel electrode was formed a "—" shape of opening parallel to the narrow side and with a width of 5 $\mu$m, almost at the center of the pixel. An electrode of chromium was formed with a shape of "—" corresponding to the opening. The electrode was designed to allow a different voltage from that to the pixel region to be applied from outside. Since the electrode was formed from chromium as was for the gate electrode, there was no need for additional steps, compared with a conventional manufacturing process.

Then, a panel was assembled and a liquid crystal was injected to prepare a liquid crystal display, as described in Example 17.

While applying 8 V of voltage to the "—" shape of electrode and the counter electrode, the liquid crystal display was driven to display an image, where the voltage of pixel display was about 5 V. The liquid crystal display of this Example, as was in Example 17, did not indicate tone reversal in any direction, giving an excellent image.

Comparative Example 6

For comparison, a liquid crystal display was driven as described in Example 18, except that a voltage was not applied to the "—" shape of electrode during applying a voltage. The dividing status was irregular and afterimages were observed.

EXAMPLE 19

A TFT substrate was prepared as described in Example 17. The substrate and a color filter substrate were assembled into an empty panel. The adhered substrates, i.e., the empty panel, was placed in a vacuum chamber. After vacuuming, into the empty panel was injected a liquid crystal solution consisting of a common nematic liquid crystal, a UV-curable monomer (Nippon Kayaku; KAYARAD PET-30; 0.2 wt % to the liquid crystal) and an initiator (Ciba-Geigy; Irganox 907; 5 wt % to the monomer).

The display panel was heated to 110° C. Then, while applying a sinusoidal voltage of 40 V and 1 Hz to the "—" shape of electrode, the substrate was cooled at the rate of 1° C./min, during which the gate wire, the drain wire and the pixel electrode on the counter substrate were kept at 0 V. Even in these conditions, it was observed that a voltage was naturally induced on the pixel electrode on the TFT substrate, a voltage was applied to the upper and the lower pixel electrodes, and the liquid crystal was influenced by the oblique electric field and the driving electric field, leading to whitening in the pixel. After allowing it to be cooled to room temperature, while applying a sinusoidal voltage of 15 V and 30 Hz to the "—" shape of electrode, UV(0.1 mW/cm$^2$) was radiated for 30 min.

To the liquid cell were adhered an optical compensator and a polarizing plate, to prepare a liquid crystal display. Then, without applying a voltage to the "—" shape of electrode of the liquid crystal display, an image was displayed as usual. As a result, it showed an excellent display without tone reversal in a half tone and with a wide angle of visibility. It was evaluated by measuring its angle of visibility during gradation display at an interval of the azimuth angle of 45°, with a liquid-crystal evaluation apparatus (Otsuka Denshi; LCD-5000), indicating that it provided almost equivalent properties for an angle of visibility in all directions without tone reversal. In addition, the response speed was much higher than an ordinary TN. When the power was turned off and then on, the liquid crystal remained in bend orientation, indicating that the bend orientation was fixed.

EXAMPLE 20

An empty panel was prepared as described in Example 19, into which a mixture of a liquid crystal, a UV-curable monomer and an initiator was injected. A rectangular-wave voltage of 40 V and 1 Hz was applied to the "—" shape of electrode of the display panel at room temperature, maintaining the pixel electrode of the counter substrate and the drain and the gate wires at 0 V. Then UV (0.1 mW/cm$^2$) was radiated for 1 hour from a high-pressure mercury-vapor lamp, applying a voltage of 15 V, 30 Hz to the "—" shape of electrode.

To the liquid crystal cell were adhered an optical compensator and a polarizing plate, to prepare a liquid crystal display. Without applying a voltage to the "—" shape of electrode of the liquid crystal display, an image was displayed as usual. It showed an excellent display without tone reversal in a half tone and with a wide angle of visibility. It was evaluated by measuring its angle of visibility during gradation display at an interval of the azimuth angle of 45°, with a liquid-crystal evaluation apparatus (Otsuka Denshi; LCD-5000), indicating that it provided almost equivalent properties for an angle of visibility in all directions without tone reversal. In addition, the response speed was high and the bend orientation was fixed.

EXAMPLE 21

A liquid crystal display was prepared as described in Example 20, except that the rectangular opening as shown in FIG. 13(b) was formed in the center of the pixel and the control electrode 25 had a "|" shape according to the shape of the opening. A rectangular-wave voltage of 40 V and 1 Hz was applied to the "|" shape of electrode as described in Example 20, maintaining the pixel electrode of the counter substrate and the drain and the gate wires at 0 V, while UV (0.1 mW/cm$^2$) was radiated for 1 hour from a high-pressure mercury-vapor lamp.

To the cell were adhered an optical compensator and a polarizing plate, to prepare a liquid crystal display. Without applying a voltage to the "|" shape of electrode of the liquid crystal display, an image was displayed as usual. It showed an excellent display without tone reversal in a half tone and with a wide angle of visibility. It was evaluated by measuring its angle of visibility during gradation display at an interval of the azimuth angle of 45°, with a liquid-crystal evaluation apparatus (Otsuka Denshi; LCD-5000), indicating that it provided almost equivalent properties for an angle of visibility in all directions without tone reversal. In addition, the response speed was high and the bend orientation was fixed.

EXAMPLE 22

An empty panel was prepared as described in Example 18, into which a mixture of a liquid crystal, a UV-curable monomer and an initiator was injected as in Example 20, and the monomer was cured with UV.

To the liquid crystal cell were adhered an optical compensator and a polarizing plate, to prepare a liquid crystal display. Without applying a voltage to the "—" shape of electrode of the liquid crystal display, an image was displayed as usual. It showed an excellent display without tone reversal in a half tone and with a wide angle of visibility. It was evaluated by measuring its angle of visibility during gradation display at an interval of the azimuth angle of 45°, with a liquid-crystal evaluation apparatus (Otsuka Denshi; LCD-5000), indicating that it provided almost equivalent properties for an angle of visibility in all directions without tone reversal. In addition, the response speed was high and the bend orientation was fixed.

EXAMPLE 23

Using a TFT substrate as described in Example 17, the substrate of the color filter was an ordinary substrate with no control electrodes and no openings. To the ITO of the substrate of the color filter side was applied a polyimide orientating agent (Nissan Kagaku; SE-7210), which was then baked to form an oriented film, and using a photoresist the orientation of each pixel was divided, during which the pre-tilt direction of the liquid crystal on the color filter substrate was set to be parallel to the tilt direction of the liquid crystal when applying a voltage to the control electrode on the TFT substrate.

An empty panel was prepared as described in Example 17, into which a mixture of a liquid crystal, a UV-curable monomer and an initiator was injected as described in Example 20. A rectangular-wave voltage of 40 V and 1 Hz was applied to the "—" shape of electrode at room temperature, maintaining the pixel electrode of the counter substrate and the drain and the gate wires at 0 V. Then, UV (0.1 mW/cm$^2$) was radiated for 1 hour from a high-pressure mercury-vapor lamp, applying a voltage of 15 V, 30 Hz to the "—" shape of electrode.

Using the liquid crystal display, an image was displayed as usual, where the voltage of pixel display was about 5.5 V. The display did not indicate tone reversal in any direction, giving an excellent image. In addition, a disclination or an after image was not observed. In addition, the response speed was high and the bend orientation was fixed.

What is claimed is:

1. A liquid crystal display for generating an image with a plurality of pixels, comprising:
    a first substrate and a second substrate;
    a liquid crystal layer disposed between said first and second substrates, and having at least two micro-regions therein;
    a first electrode and a second electrode disposed on said first and second substrates, respectively, and an opening provided in said first electrode to divide said liquid crystal layer into said micro-regions; and
    a control electrode at least partially overlapping the opening of said first electrode, said control electrode being selectively electrically connected to said second electrode to produce an electric field through the opening in said first electrode and through said liquid crystal layer and to orient molecules in the liquid crystal layer between said control electrode and said second electrode according to the electric field, said second electrode being continuous in an area opposite to said control electrode,
    whereby all molecules between said opening and said second electrode are displaced from an initial orientation state.

2. A liquid crystal display as claimed in claim 1, wherein the liquid crystal layer consists of a liquid crystal with a negative dielectric anisotropy.

3. A liquid crystal display as claimed in claim 2, having at least two micro-regions in the liquid crystal layer, wherein tilt directions of the liquid crystal are different from each other.

4. A liquid crystal display as claimed in claim 1, wherein the liquid crystal layer has a perpendicular orientation nearest to one of said first and second substrates and parallel orientation nearest to the other of said first and second substrates.

5. A liquid crystal display as claimed in claim 4, having at least two micro-regions in the liquid crystal layer, wherein tilt directions of the liquid crystal are different from each other.

6. A liquid crystal display as claimed in claim 1, wherein the liquid crystal layer has bent deformation from one of said first and second substrates to the other of said first and second substrates.

7. A liquid crystal display as claimed in claim 6, having at least two micro-regions in the liquid crystal layer, wherein tilt directions of the liquid crystal are different from each other.

8. A liquid crystal display as claimed in claim 6, comprising at least one optical compensator between at least one substrate and a polarizing plate, said optical compensator being optically negative and uniaxial and being positioned in a manner that its optical axis is parallel to a line normal to the substrate.

9. The liquid crystal display as claimed in claim 1, wherein said pixels have a diagonal line and said control electrode is formed on the diagonal line of each pixel.

10. A liquid crystal display as claimed in claim 1, wherein said pixels have a longitudinal side and said control electrode has an area parallel to the longitudinal side of each pixel.

11. A liquid crystal display as claimed in claim 1, wherein said pixels have a narrow side and said control electrode has an area parallel to the narrow side of each pixel.

12. A liquid crystal display as claimed in claim 1, comprising at least one optical compensator between at least one substrate and a polarizing plate.

13. A liquid crystal display according to claim 1, wherein said liquid crystal layer is a nematic liquid crystal.

14. The liquid crystal display according to claim 1, wherein an opening is provided in both said first electrode and said second electrode to divide said liquid crystal layer into the micro-regions such that the openings are opposed to each other across said liquid crystal layer, and a first control electrode and a second control electrode are respectively at least partially overlapping said openings in said first electrode and said second electrode.

15. A process for driving a liquid crystal display comprising a liquid crystal layer disposed between two substrates, each of said substrates having an electrode thereon, wherein the liquid crystal layer has at least two micro-regions, and an opening provided in one of said electrodes to divide said liquid crystal layer into said micro-regions, and a control electrode at least partially overlapping the opening, said control electrode being selectively electrically connected to an opposing electrode to produce an electric field through the opening and through said liquid crystal layer and to orient molecules in the liquid crystal layer between said control electrode and the opposing electrode in accordance with the electric field, wherein the opposing electrode is continuous in an area opposite to said control electrode and all molecules between the opening and said first electrode are displaced from an initial orientation state, said process comprising the step of:
    applying a voltage across said control electrode and the opposing electrode which is equal to or higher than a voltage applied across said electrode having said opening and the opposing electrode thereto.

16. A liquid crystal display, comprising:
    a first substrate and a second substrate having a liquid crystal layer therebetween, said liquid crystal layer having at least two micro-regions therein;
    a first electrode and a second electrode disposed on said first substrate and said second substrate, respectively, and an opening provided in said second electrode to divide said liquid crystal layer into said micro-regions; and a control electrode at least partially overlapping said opening of said second electrode, and selectively electrically connected to said first electrode to produce an electric field through the opening in said second electrode and through said liquid crystal layer, to orient molecules in the liquid crystal layer between said control electrode and said first electrode according to the electric field, said first electrode being continuous in an area opposite to said control electrode, whereby all molecules between the opening and said first electrode are displaced from an initial orientation state.

* * * * *

UNITED STATES PATENT AND TRADEMARK OFFICE
CERTIFICATE OF CORRECTION

PATENT NO. : 6,256,082 B1
DATED : July 3, 2001
INVENTOR(S) : Masayoshi Suzuki, Hideya Murai, Toshiya Ishii, Yoshihiko Hirai, Kazumi Kobayashi, Hiroaki Matsuyama, Daisuke Inoue It is certified that error appears in the above-identified patent and that said Letters Patent is hereby corrected as shown below:

Column 24,
Line 32, delete "And" insert -- $\Delta$nd --

Column 28,
Line 23, delete "And" insert -- $\Delta$nd --

Signed and Sealed this

Twelfth Day of March, 2002

Attest:

JAMES E. ROGAN
Attesting Officer     Director of the United States Patent and Trademark Office